United States Patent
Takeda et al.

(10) Patent No.: US 12,309,627 B2
(45) Date of Patent: May 20, 2025

(54) TECHNIQUES FOR SCHEDULING ACROSS MULTIPLE CELLS

(71) Applicant: QUALCOMM Incorporated, San Diego, CA (US)

(72) Inventors: Kazuki Takeda, Tokyo (JP); Mostafa Khoshnevisan, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 17/710,537

(22) Filed: Mar. 31, 2022

(65) Prior Publication Data

US 2023/0319614 A1 Oct. 5, 2023

(51) Int. Cl.
*H04W 24/10* (2009.01)
*H04W 24/08* (2009.01)
*H04W 72/1268* (2023.01)

(52) U.S. Cl.
CPC ........... *H04W 24/10* (2013.01); *H04W 24/08* (2013.01); *H04W 72/1268* (2013.01)

(58) Field of Classification Search
CPC .. H04W 24/10; H04W 24/08; H04W 72/1268
See application file for complete search history.

(56) References Cited

U.S. PATENT DOCUMENTS

| | | | | |
|---|---|---|---|---|
| 9,496,995 B2* | 11/2016 | Kim | ...... | H04W 72/23 |
| 9,544,882 B2* | 1/2017 | Seo | ...... | H04L 5/001 |
| 2016/0149628 A1* | 5/2016 | Davydov | ...... | H04L 5/001 |
| | | | | 370/329 |
| 2019/0081687 A1* | 3/2019 | Sadiq | ...... | H04W 74/0833 |
| 2020/0196365 A1* | 6/2020 | Tang | ...... | H04W 76/14 |
| 2021/0127387 A1 | 4/2021 | Huang et al. | | |
| 2021/0167911 A1* | 6/2021 | Xiao | ...... | H04W 72/0446 |

(Continued)

FOREIGN PATENT DOCUMENTS

WO    WO-2014067482 A1 *  5/2014   ........ H04W 52/0216

OTHER PUBLICATIONS

International Search Report and Written Opinion—PCT/US2023/063660—ISA/EPO—Jun. 29, 2023.

(Continued)

*Primary Examiner* — Deepa Belur
(74) *Attorney, Agent, or Firm* — Holland & Hart LLP

(57) ABSTRACT

Methods, systems, and devices for wireless communication are described. A network entity may schedule uplink resource allocations across multiple cells by defining selection criteria for the uplink resource allocations in which to transmit a channel state information (CSI) report. For example, a user equipment (UE) may receive a control signal from the network entity, which may schedule the UE to transmit the CSI report in an uplink resource allocation on a component carrier in a carrier aggregation configuration. In some examples, the UE may transmit the CSI report by multiplexing the CSI report in uplink resource allocations on multiple component carriers. In some examples, the CSI report may be transmitted in an uplink resource allocation on a smallest component carrier index. Accordingly, the defined selection criteria may allow for more efficient procedures at the UE, which may result in increased efficiency and decreased overhead.

30 Claims, 17 Drawing Sheets

(56) References Cited

U.S. PATENT DOCUMENTS

| | | | | |
|---|---|---|---|---|
| 2021/0266136 A1* | 8/2021 | Baldemair | ............... | H04L 5/001 |
| 2021/0274551 A1* | 9/2021 | Takata | ................. | H04W 72/21 |
| 2021/0399866 A1* | 12/2021 | Li | ......................... | H04W 76/15 |
| 2022/0271873 A1* | 8/2022 | Gao | ........................ | H04L 1/1854 |
| 2024/0048288 A1* | 2/2024 | Fakoorian | ............. | H04L 1/1822 |

OTHER PUBLICATIONS

Samsung: "CSI Collision Handling for CoMP", 3GPP TSG RAN WG1 #70, R1-123468, 3rd Generation Partnership Project, Mobile Competence Centre, 650, Route Des Lucioles, F-06921 Sophia-Antipolis Cedex, France, vol. RAN WG1, No. Qingdao, China, Aug. 13, 2012-Aug. 17, 2012, Aug. 5, 2012, XP050661347, 3 pages, Section 2.

* cited by examiner

TECHNIQUES FOR SCHEDULING ACROSS MULTIPLE CELLS

FIELD OF TECHNOLOGY

The following relates to wireless communication, including techniques for scheduling across multiple cells.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may report channel state information. However, for some use cases, conventional reporting techniques may be deficient or sub-optimal in some current configurations.

SUMMARY

The described techniques relate to improved methods, systems, devices, and apparatuses that support techniques for scheduling across multiple component carriers. Generally, the described techniques provide for scheduling across multiple cells by defining selection criteria for the uplink resource allocations in which to transmit a channel state information (CSI) report. For example, a user equipment (UE) may receive a control signal from a network entity, which may schedule the UE to transmit the CSI report in an uplink resource allocation on a component carrier in a carrier aggregation configuration. In some examples, the UE may transmit the CSI report by multiplexing the CSI report in uplink resource allocations on multiple component carriers. In some examples, the CSI report may be transmitted in an uplink resource allocation on a smallest component carrier index. Accordingly, the defined selection criteria may allow for more efficient procedures at the UE, which may result in increased efficiency and decreased overhead.

A method for wireless communication at a UE is described. The method may include receiving a control signal scheduling transmission of a channel state information report and indicating a set of uplink resource allocations across a set of component carriers according to a carrier aggregation configuration, monitoring for a reference signal on a first component carrier of the set of component carriers based on receiving the control signal, and transmitting, based on the monitoring, the channel state information report in an uplink resource allocation on a second component carrier, the set of uplink resource allocations including the uplink resource allocation and the set of component carriers including the second component carrier.

An apparatus for wireless communication at a UE is described. The apparatus may include a processor, memory coupled with the processor, and instructions stored in the memory. The instructions may be executable by the processor to cause the apparatus to receive a control signal scheduling transmission of a channel state information report and indicating a set of uplink resource allocations across a set of component carriers according to a carrier aggregation configuration, monitor for a reference signal on a first component carrier of the set of component carriers based on receiving the control signal, and transmit, based on the monitoring, the channel state information report in an uplink resource allocation on a second component carrier, the set of uplink resource allocations including the uplink resource allocation and the set of component carriers including the second component carrier.

Another apparatus for wireless communication at a UE is described. The apparatus may include means for receiving a control signal scheduling transmission of a channel state information report and indicating a set of uplink resource allocations across a set of component carriers according to a carrier aggregation configuration, means for monitoring for a reference signal on a first component carrier of the set of component carriers based on receiving the control signal, and means for transmitting, based on the monitoring, the channel state information report in an uplink resource allocation on a second component carrier, the set of uplink resource allocations including the uplink resource allocation and the set of component carriers including the second component carrier.

A non-transitory computer-readable medium storing code for wireless communication at a UE is described. The code may include instructions executable by a processor to receive a control signal scheduling transmission of a channel state information report and indicating a set of uplink resource allocations across a set of component carriers according to a carrier aggregation configuration, monitor for a reference signal on a first component carrier of the set of component carriers based on receiving the control signal, and transmit, based on the monitoring, the channel state information report in an uplink resource allocation on a second component carrier, the set of uplink resource allocations including the uplink resource allocation and the set of component carriers including the second component carrier.

Some examples of the method, apparatuses, and non-transitory computer-readable medium described herein may further include operations, features, means, or instructions for transmitting an uplink message in a second uplink resource allocation on a third component carrier, the set of uplink resource allocations including the second uplink resource allocation and the set of component carriers including the third component carrier.

In some examples of the method, apparatuses, and non-transitory computer-readable medium described herein, an index of the third component carrier may be less than an index of the second component carrier.

In some examples of the method, apparatuses, and non-transitory computer-readable medium described herein, an index of the third component carrier may have a greatest index of the set of component carriers.

In some examples of the method, apparatuses, and non-transitory computer-readable medium described herein, transmitting the channel state information report may include operations, features, means, or instructions for transmitting the channel state information report with uplink data in the uplink resource allocation, where the channel state information report may be multiplexed with the uplink data.

Some examples of the method, apparatuses, and non-transitory computer-readable medium described herein may further include operations, features, means, or instructions for transmitting, based on the monitoring, a second channel state information report in a second uplink resource allocation on a third component carrier, the set of uplink resource allocations including the second uplink resource allocation and the set of component carriers including the third component carrier.

In some examples of the method, apparatuses, and non-transitory computer-readable medium described herein, the channel state information report and second channel state information report include a same channel state information report.

Some examples of the method, apparatuses, and non-transitory computer-readable medium described herein may further include operations, features, means, or instructions for encoding an aperiodic channel state information report based on the monitoring, where the channel state information report includes a first portion of the encoded aperiodic channel state information report and the second channel state information report includes a second portion of the encoded aperiodic channel state information report.

Some examples of the method, apparatuses, and non-transitory computer-readable medium described herein may further include operations, features, means, or instructions for encoding a first portion of an aperiodic channel state information report based on the monitoring, where the channel state information report includes the encoded first portion and encoding a second portion of the aperiodic channel state information report based on the monitoring, where the second channel state information report includes the encoded second portion.

Some examples of the method, apparatuses, and non-transitory computer-readable medium described herein may further include operations, features, means, or instructions for refraining from transmitting, based on receiving the control signal, uplink data in the uplink resource allocation on the second component carrier.

Some examples of the method, apparatuses, and non-transitory computer-readable medium described herein may further include operations, features, means, or instructions for communicating with a first cell via the first component carrier and communicating with a second cell via the second component carrier.

In some examples of the method, apparatuses, and non-transitory computer-readable medium described herein, the second component carrier may have a lowest index of the set of component carriers.

In some examples of the method, apparatuses, and non-transitory computer-readable medium described herein, the channel state information report includes an aperiodic channel state information report.

In some examples of the method, apparatuses, and non-transitory computer-readable medium described herein, the reference signal includes a channel state information reference signal.

A method for wireless communication at a network entity is described. The method may include transmitting a control signal scheduling transmission of a channel state information report and indicating a set of uplink resource allocations across a set of component carriers according to a carrier aggregation configuration, transmitting a reference signal on a first component carrier of the set of component carriers based on receiving the control signal, and receiving, based on transmitting the reference signal, the channel state information report in an uplink resource allocation on a second component carrier, the set of uplink resource allocations including the uplink resource allocation and the set of component carriers including the second component carrier.

An apparatus for wireless communication at a network entity is described. The apparatus may include a processor, memory coupled with the processor, and instructions stored in the memory. The instructions may be executable by the processor to cause the apparatus to transmit a control signal scheduling transmission of a channel state information report and indicating a set of uplink resource allocations across a set of component carriers according to a carrier aggregation configuration, transmit a reference signal on a first component carrier of the set of component carriers based on receiving the control signal, and receive, based on transmitting the reference signal, the channel state information report in an uplink resource allocation on a second component carrier, the set of uplink resource allocations including the uplink resource allocation and the set of component carriers including the second component carrier.

Another apparatus for wireless communication at a network entity is described. The apparatus may include means for transmitting a control signal scheduling transmission of a channel state information report and indicating a set of uplink resource allocations across a set of component carriers according to a carrier aggregation configuration, means for transmitting a reference signal on a first component carrier of the set of component carriers based on receiving the control signal, and means for receiving, based on transmitting the reference signal, the channel state information report in an uplink resource allocation on a second component carrier, the set of uplink resource allocations including the uplink resource allocation and the set of component carriers including the second component carrier.

A non-transitory computer-readable medium storing code for wireless communication at a network entity is described. The code may include instructions executable by a processor to transmit a control signal scheduling transmission of a channel state information report and indicating a set of uplink resource allocations across a set of component carriers according to a carrier aggregation configuration, transmit a reference signal on a first component carrier of the set of component carriers based on receiving the control signal, and receive, based on transmitting the reference signal, the channel state information report in an uplink resource allocation on a second component carrier, the set of uplink resource allocations including the uplink resource allocation and the set of component carriers including the second component carrier.

Some examples of the method, apparatuses, and non-transitory computer-readable medium described herein may further include operations, features, means, or instructions for receiving an uplink message in a second uplink resource allocation on a third component carrier, the set of uplink resource allocations including the second uplink resource allocation and the set of component carriers including the third component carrier.

In some examples of the method, apparatuses, and non-transitory computer-readable medium described herein, an index of the third component carrier may be less than an index of the second component carrier.

In some examples of the method, apparatuses, and non-transitory computer-readable medium described herein, an index of the third component carriers may have a greatest index of the set of component carriers.

In some examples of the method, apparatuses, and non-transitory computer-readable medium described herein, receiving the channel state information report may include operations, features, means, or instructions for receiving the channel state information report with uplink data in the uplink resource allocation, where the channel state information report may be multiplexed with the uplink data.

Some examples of the method, apparatuses, and non-transitory computer-readable medium described herein may further include operations, features, means, or instructions for receiving, based on transmitting the reference signal, a second channel state information report in a second uplink resource allocation on a third component carrier, the set of uplink resource allocations including the second uplink resource allocation and the set of component carriers including the third component carrier.

In some examples of the method, apparatuses, and non-transitory computer-readable medium described herein, the channel state information report and the second channel state information report include a same channel state information report.

In some examples of the method, apparatuses, and non-transitory computer-readable medium described herein, the channel state information report includes a first portion of an encoded aperiodic channel state information report and the second channel state information report includes a second portion of the encoded aperiodic channel state information report.

In some examples of the method, apparatuses, and non-transitory computer-readable medium described herein, the channel state information report includes an encoded first portion of an aperiodic channel state information report and the second channel state information report includes an encoded second portion of the aperiodic channel state information report.

In some examples of the method, apparatuses, and non-transitory computer-readable medium described herein, the first component carrier may be associated with a first cell of the network entity and the second component carrier may be associated with a second cell of the network entity.

In some examples of the method, apparatuses, and non-transitory computer-readable medium described herein, the second component carrier may have a lowest index of the set of component carriers.

In some examples of the method, apparatuses, and non-transitory computer-readable medium described herein, the channel state information report includes an aperiodic channel state information report.

In some examples of the method, apparatuses, and non-transitory computer-readable medium described herein, the reference signal includes a channel state information reference signal.

DETAILED DESCRIPTION

Figure 1:
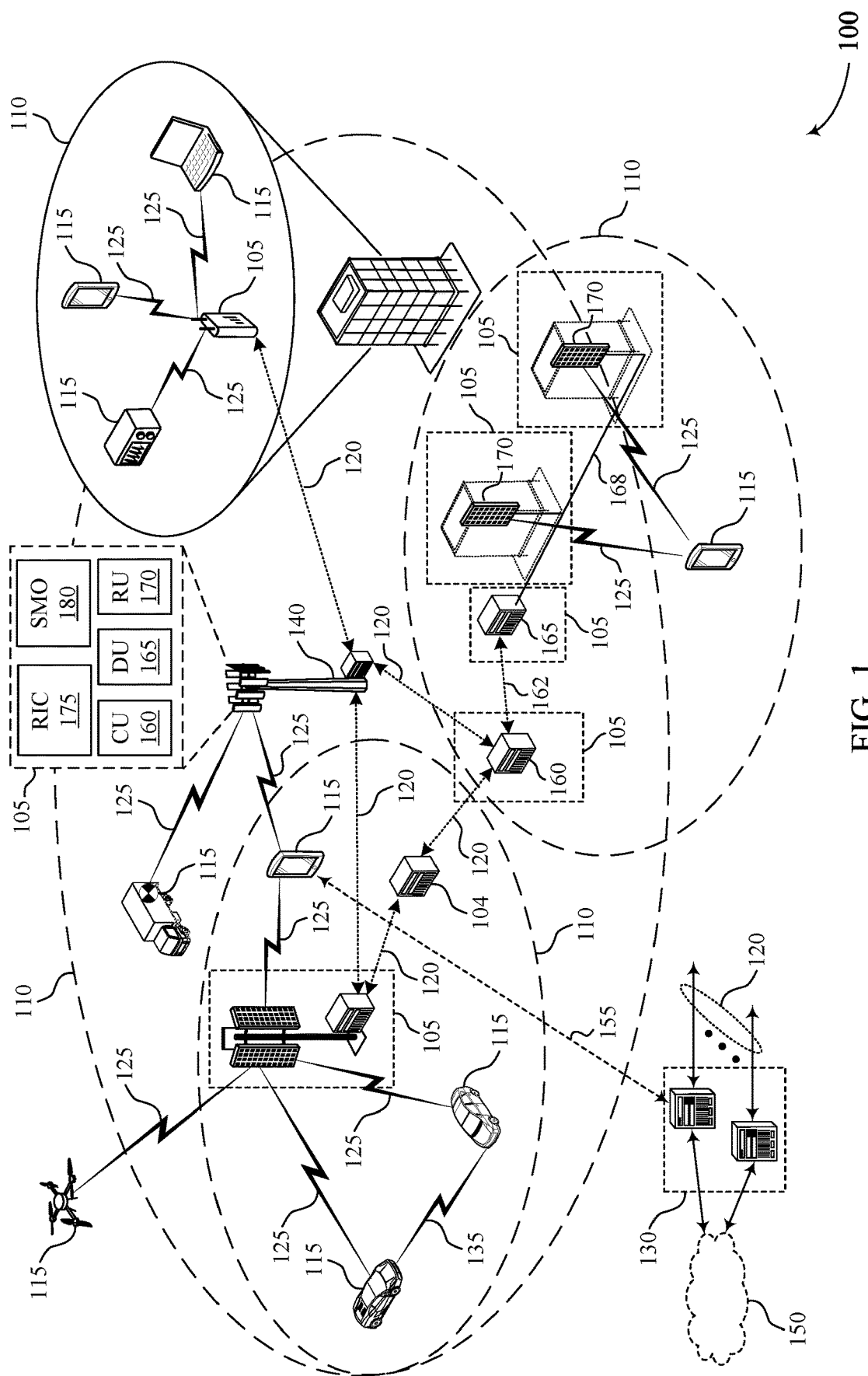
FIG. 1 illustrates an example of a wireless communications system that supports techniques for scheduling across multiple cells in accordance with one or more aspects of the present disclosure.

In some wireless communications systems, a network entity may transmit a control signal (e.g., a downlink control information (DCI) message) to a user equipment (UE). The control signal may schedule the UE to transmit a channel state information (CSI) report (e.g., an aperiodic CSI (A-CSI) report) in an uplink resource allocation (e.g., a physical uplink shared channel (PUSCH) allocation) on multiple component carriers. For example, the network entity may transmit a reference signal (e.g., a CSI reference signal (CSI-RS)) to the UE for the UE to measure and perform CSI reporting. In some cases, the control signal may schedule transmission of uplink resource allocations on multiple component carriers in a carrier aggregation configuration. For example, the UE may communicate with multiple cells of network entities via multiple component carriers. It may be beneficial to enable the UE to select an uplink resource allocation (e.g., on which component carrier) in which to transmit the CSI report, for example, to improve coordination between devices.

Techniques, systems, and devices are described herein to enable resource selection for scheduling across multiple component carriers, which may increase efficiency at the UE. For example, enabling resource selection for scheduling across multiple component carriers may improve scheduling CSI reporting in uplink resource allocations on multiple component carriers. The UE may receive a control signal from the network entity, and the control signal may indicate the UE is to transmit the CSI report in uplink resource allocations on multiple component carriers as scheduled by the control signal. The UE may monitor for and measure a reference signal received from the network entity and transmit the CSI report by multiplexing the CSI report in an uplink resource allocation on multiple component carriers. In some examples, the CSI report may be multiplexed on the uplink resource allocation transmitted on a smallest component carrier index.

Additionally, or alternatively, the CSI report may be multiplexed in a specified uplink resource allocation of scheduled uplink resource allocations. In one example, the control signal may schedule two uplink resource allocations on two component carriers, and the UE may multiplex the CSI report on the second scheduled uplink resource allocation (e.g., the uplink resource allocation on a component carrier with a higher frequency or a greater index of the two component carriers). In another example, the control signal may schedule the CSI report in multiple (e.g., more than two) uplink resource allocations on multiple component carriers, and the UE may multiplex the CSI report on the penultimate scheduled uplink resource allocation (e.g., an uplink resource allocation on a component carrier with a second-highest frequency or a second-greatest index of the multiple component carriers). In another example, the control signal may indicate that a scheduled uplink resource allocation on a component carrier does not carry uplink data. The UE may transmit the CSI report in the uplink resource allocation on the component carrier that is not scheduled to carry uplink data. The selection criteria may allow for more efficient CSI reporting on multiple uplink resource allocations in a carrier aggregation configuration, which may result in increased efficiency and decreased overhead, among other benefits.

Aspects of the disclosure are initially described in the context of wireless communications systems. Aspects of the disclosure are additionally described in the context of transmission schemes and a process flow. Aspects of the disclosure are further illustrated by and described with reference to apparatus diagrams, system diagrams, and flowcharts that relate to techniques for scheduling across multiple cells.

FIG. 1 illustrates an example of a wireless communications system 100 that supports techniques for scheduling across multiple cells in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for scheduling across multiple cells as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

A UE 115 in communications with a network entity 105 may perform periodic or aperiodic reporting on information regarding a communication channel (e.g., a communication link 125). In some examples, the UE 115 may perform periodic channel reporting, which may include the UE 115 transmitting a report (e.g., a CSI report) to the network entity 105 according to a time interval configured by a higher communications layer (e.g., an RRC message). In other examples, the UE 115 may perform aperiodic channel reporting, which may include the network entity 105 transmitting a control signal (e.g., a DCI message) scheduling a transmission of the CSI report by the UE 115. In this example (e.g., aperiodic CSI reporting), the control signal may include a CSI request field indicating the UE 115 is to transmit the CSI report in an uplink resource allocation on one or multiple component carriers. The size of the CSI request field may be based on an RRC parameter configuration.

The network entity 105 may transmit reference signals on one or multiple component carriers to the UE 115. The UE 115 may measure the reference signals to perform CSI reporting. The reference signals may be associated with a trigger state (e.g., a codepoint) indicated by the RRC parameter configuration. The trigger state may be associated with a reference signal for one or more component carriers, and the trigger state may indicate (e.g., trigger) for the UE 115 to perform CSI reporting. The UE 115 may perform CSI reporting by multiplexing the CSI report in an uplink resource allocation on a component carrier scheduled by the control signal. There may be a single control signal scheduling the CSI reporting in the uplink resource allocations on a component carrier, and there may be one uplink resource allocation per slot (e.g., per frequency and time resource) scheduled by the control signal.

Various aspects of the described techniques support resource selection for scheduling across multiple component carriers (e.g., for communicating with multiple cells) to reduce inefficiency and overhead. In some examples, the UE 115 may multiplex the CSI report on the uplink resource allocation transmitted on a component carrier with a smallest index of component carriers on which an uplink resource allocation is scheduled by the control signal. Additionally, or alternatively, the UE 115 may multiplex the CSI report in a specified uplink resource allocation of scheduled uplink resource allocations. In some examples, the control signal may indicate that one of the scheduled uplink resource allocations on a component carrier does not carry uplink data. The UE 115 may multiplex the CSI report in the uplink resource allocation on the component carrier that may not be scheduled to carry uplink data. In this way, the selection criteria may allow for more efficiently CSI reporting on multiple uplink resource allocations, which may result in increased efficiency and decreased overhead, among other benefits.

In some examples, the network entity 105 may transmit a DCI message and a CSI-RS for the UE 115 to perform A-CSI reporting. The DCI may schedule (e.g., trigger) for the UE 115 to multiplex the A-CSI report in a PUSCH allocation on a component carrier. In some examples, the DCI may schedule two PUSCH allocations on multiple component carriers, and the UE 115 may multiplex the A-CSI report on the second scheduled PUSCH allocation of the two PUSCH allocations. In some examples, if the DCI schedules multiple (e.g., more than two) PUSCH allocations on multiple component carriers, the UE 115 may multiplex the A-CSI report on the penultimate PUSCH allocation of the multiple PUSCH allocations.

Additionally, or alternatively, the control signal may indicate that one of the scheduled uplink resource allocations on a component carrier does not carry uplink data on an uplink shared channel (UL-SCH). The control may include a UL-SCH indicator field that may indicate whether one of the scheduled uplink resource allocations on a component carrier may carry uplink data. In this case, the UE may multiplex the CSI report in the uplink resource allocation on the component carrier that may not be scheduled to carry uplink data. A slot offset between the slot including the control and the slot including the uplink resource allocation without uplink data may be based on the RRC parameter configuration. For example, the DCI may indicate that one of the scheduled PUSCH allocations on a component carrier does not carry uplink data on an uplink shared channel (UL-SCH). In this case, the UE may multiplex the A-CSI report in the PUSCH allocation on the component carrier that may not be scheduled to carry uplink data.

In some examples, if the control signal schedules two uplink resource allocations on multiple component carriers, the UE 115 may multiplex the CSI report on the second scheduled uplink resource allocation of the two uplink resource allocations. In some examples, if the control signal schedules multiple (e.g., more than two) uplink resource allocations on multiple component carriers, the UE 115 may multiplex the CSI report on the penultimate uplink resource allocation of the multiple uplink resource allocations.

In some examples, the UE 115 may multiplex the A-CSI report on the PUSCH allocation transmitted on a component carrier with a smallest index among the component carriers where the PUSCH allocations are scheduled by the DCI. Additionally, or alternatively, the UE 115 may multiplex the A-CSI report in a specified PUSCH allocation of scheduled PUSCH allocations. In some examples, the DCI may indicate that one of the scheduled PUSCH allocations on a component carrier does not carry uplink data. The UE 115 may multiplex the A-CSI report in the PUSCH allocation on the component carrier that may not be scheduled to carry uplink data.

Figure 2:
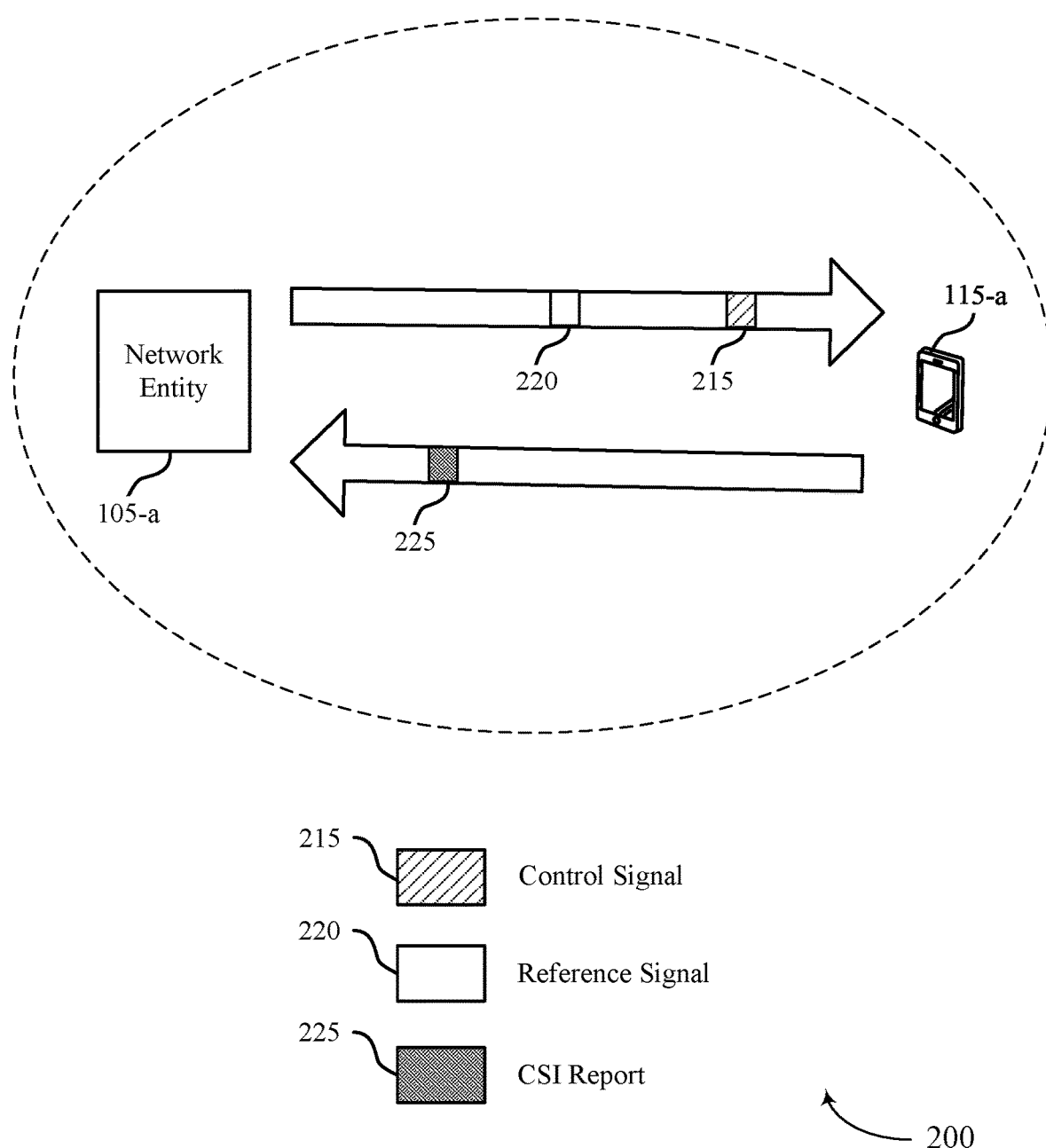
FIG. 2 illustrates an example of a wireless communications system that supports techniques for scheduling across multiple cells in accordance with one or more aspects of the present disclosure.

FIG. 2 illustrates an example of a wireless communications system 200 that supports techniques for scheduling across multiple cells in accordance with one or more aspects of the present disclosure. Wireless communications system 200 may implement, or be implemented by, one or more aspects of wireless communications system 100 and may support uplink and downlink communications between devices. For example, wireless communications system may be implemented by one or more UEs 115 and one or more network entities 105 as described with reference to FIG. 1. The wireless communications system 200 may support the defined selection criteria for CSI reporting in uplink resource allocations on multiple component carriers by the UE 115-*a*, which may support increased efficiency and reduced overhead, among other benefits.

For example, as described with reference to FIG. 1, the UE 115-*a* may perform aperiodic channel reporting. In this example, the network entity 105-*a* may transmit a control signal 215 (e.g., a DCI message). The control signal 215 may schedule transmission of a CSI report 225 (e.g., A-CSI report) by the UE 115. The control signal 215 may include a CSI request field scheduling for the UE 115-*a* to transmit the CSI report 225 in an uplink resource allocation (e.g., PUSCH allocation) on a component carrier in a carrier aggregation configuration. The size of the CSI request field included in the control signal 215 may be based on an RRC parameter configuration.

The UE 115-*a* may monitor for and measure a reference signal 220 (e.g., CSI-RS) received from the network entity 105-*a* and transmit the CSI report 225 by multiplexing the CSI report 225 in an uplink resource allocation on a component carrier. In some examples, the CSI report 225 may be multiplexed on the uplink resource allocation transmitted on a component carrier with a smallest index of component carriers on which an uplink resource allocation is scheduled by the control signal 215. Additionally, or alternatively, the CSI report 225 may be multiplexed in a specified uplink resource allocation of scheduled uplink resource allocations. In one example, the control signal 215 may schedule two uplink resource allocations on two component carriers, and the UE 115-*a* may multiplex the CSI report 225 on the second scheduled uplink resource allocation (e.g., the uplink resource allocation on a component carrier with a higher frequency or a greater index of the two component carriers). In another example, the control signal 215 may schedule the CSI report in multiple (e.g., more than two) uplink resource allocations on multiple component carriers, and the UE 115-*a* may multiple the CSI report 225 on the penultimate scheduled uplink resource allocation (e.g., an uplink resource allocation on a component carrier with a second-highest frequency or a second-greatest index of the multiple component carriers).

In some examples, the CSI report 225 may be copied (e.g., replicated, duplicated) and multiplexed in the uplink resource allocations, divided into multiple parts and multiplexed in the uplink resource allocations, or both. For example, the CSI report 225 may be encoded or modulated and then split into multiple portions, or the CSI report 225 may be split into multiple portions, and each portion may be encoded or modulated. The UE 115-*a* may transmit a first portion of the CSI report 225 in a first uplink resource allocation on a first component carrier and transmit a second portion of the CSI report 225 in a second uplink resource allocation on a second component carrier.

In some examples, the control signal 215 may indicate that one of the scheduled uplink resource allocations on a component carrier does not carry uplink data. The UE 115-*a* may transmit the CSI report 225 in the uplink resource allocation on the component carrier that is not scheduled to carry uplink data.

For example, the network entity 105-*a* may transmit a DCI message and a CSI-RS for the UE 115-*a* to perform A-CSI reporting. The DCI may schedule (e.g., trigger) for the UE 115-*a* to multiplex the A-CSI report in a PUSCH allocation on a component carrier. In some examples, the DCI may schedule two PUSCH allocations on multiple component carriers, and the UE 115-*a* may multiplex the A-CSI report on the second scheduled PUSCH allocation of the two PUSCH allocations. In some examples, if the DCI schedules multiple (e.g., more than two) PUSCH allocations on multiple component carriers, the UE 115-*a* may multiplex the A-CSI report on the penultimate PUSCH allocation of the multiple PUSCH allocations. Additionally, or alternatively, the DCI may be copied (e.g., replicated, duplicated) and multiplexed in the PUSCH allocations, divided into multiple parts and multiplexed in the PUSCH allocations, or both. In another example, the DCI may indicate that at least one of the scheduled PUSCH allocations on a component carrier does not carry uplink data. The UE 115-*a* may transmit the A-CSI report in the PUSCH allocation on the component carrier that is not scheduled to carry uplink data.

Figure 3:
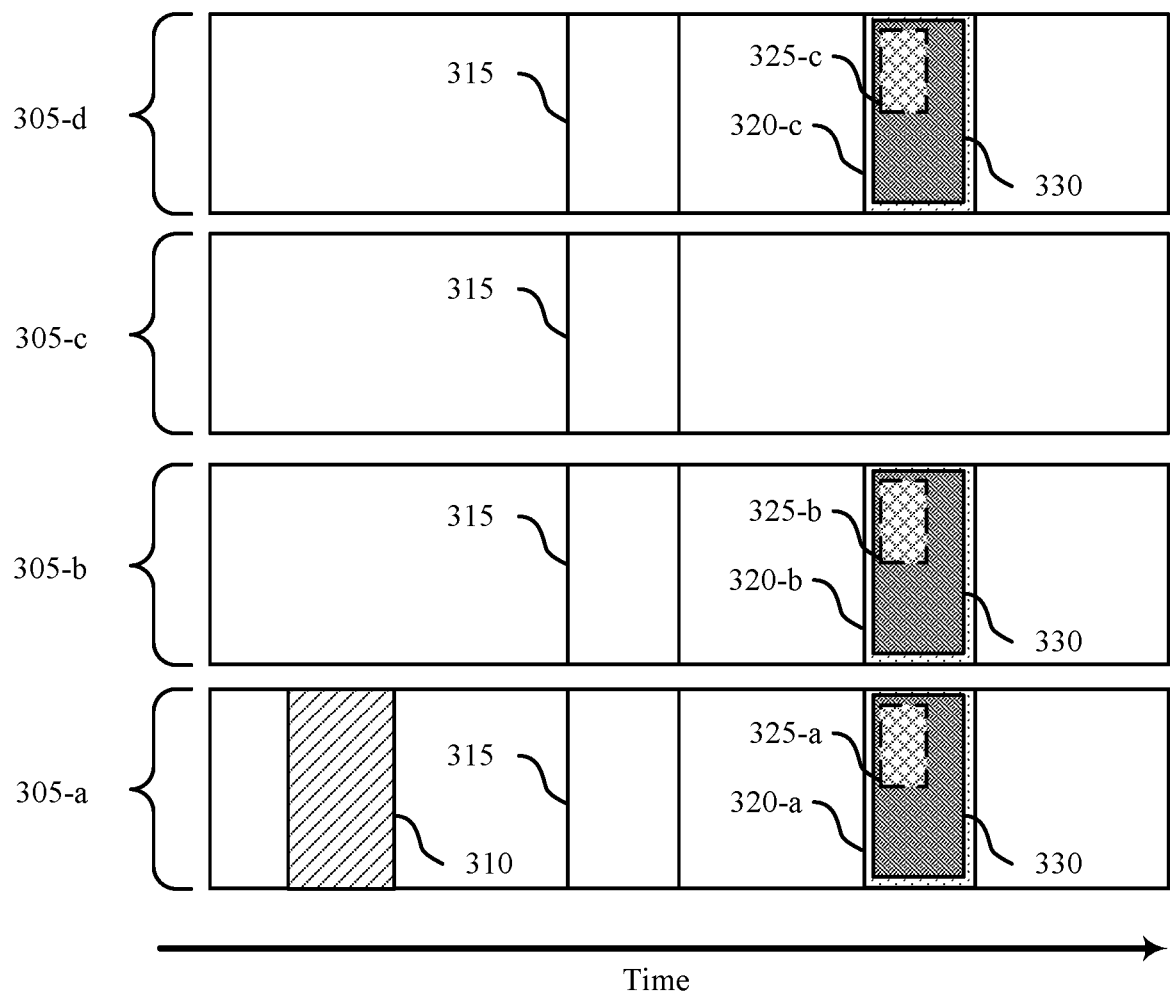
FIG. 3 illustrates an example of a transmission scheme that supports techniques for scheduling across multiple cells in accordance with one or more aspects of the present disclosure.
Figure 3:
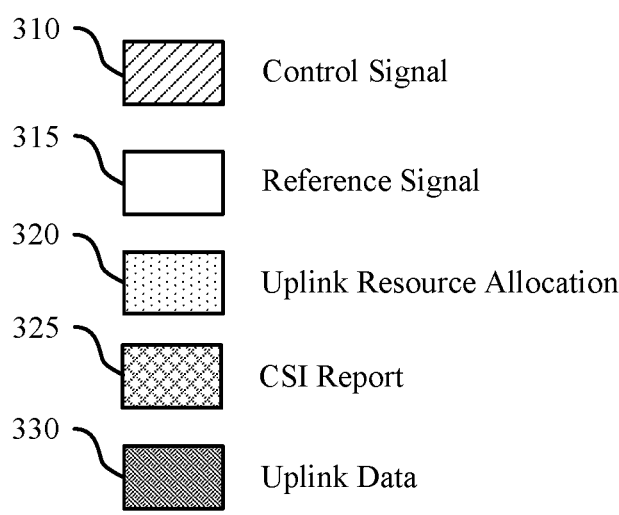

FIG. 3 illustrates an example of a transmission scheme 300 that supports techniques for scheduling across multiple cells in accordance with one or more aspects of the present disclosure. Transmission scheme 300 may implement, or be implemented by, one or more aspects of wireless communications system 100 or wireless communications system 200 and may support uplink and downlink communications between devices. For example, transmission scheme 300 may be implemented by one or more UEs 115 as described with reference to FIGS. 1 and 2.

The transmission scheme 300 depicts a control signal 310 that may be transmitted by a network entity to a UE. The control signal 310 may indicate the UE is to monitor for reference signals 315 on a set of component carriers 305 and transmit a CSI report 325 based on measuring the reference signals 315. In some examples, the control signal 310 may schedule the CSI report 325 multiplexed in an uplink resource allocation 320 on a single component carrier. The uplink resource allocations 320 may include uplink data 330. For example, a CSI report 325-*a* may be multiplexed in uplink resource allocation 320-*a* with uplink data 330 on component carrier 305-*a*. In some examples, the control signal 310 may schedule multiple uplink resource allocations 320 on multiple component carriers 305. The uplink resource allocations 320 may include uplink data 330.

In some examples, the UE 115 may multiplex the CSI report 325 in multiple uplink resource allocations 320. For example, the CSI report 325-*a* may be multiplexed in uplink resource allocation 320-*a* on component carrier 305-*a* with uplink data 330, the CSI report 325-*b* may be multiplexed in uplink resource allocation 320-*b* on component carrier 305-*b* with uplink data 330, and the CSI report 325-*c* may be multiplexed in uplink resource allocation 320-*c* on component carrier 305-*d* with uplink data 330. In some examples, the CSI report 325 may be copied (e.g., replicated, duplicated) and multiplexed in the uplink resource allocations 320, divided into multiple parts and multiplexed in the uplink resource allocations 320, or both. For example, a report may be encoded or modulated and then split into multiple portions, or a report may be split into multiple portions, and each portion may be encoded or modulated. The UE may transmit a first portion of the report (e.g., the CSI report 325-*a*) in the uplink resource allocation 320-*a* and transmit a second portion of the report (e.g., the CSI report 325-*b*) in the uplink resource allocation 320-*b*.

In one example, the CSI report 325 multiplexed on an uplink resource allocation 320 may be transmitted on a component carrier 305 with the smallest component carrier index among component carriers 305 on which an uplink resource allocation 320 is scheduled by the control signal 315. For example, the CSI report 325-*a* may be multiplexed in uplink resource allocation 320-*a* in component carrier 305-*a*, rather than on uplink resource allocation 320-*b* on component carrier 305-*b*. In another example, the control signal 310 may schedule two uplink resource allocations 320 on two component carriers (e.g., uplink resource allocation 320-*a* on component carrier 305-*a* and uplink resource allocation 320-*b* on component carrier 305-*b*). The CSI report 325-*b* may be transmitted on the second scheduled uplink resource allocation 320-*b*. The control signal 310 may schedule more than two uplink resource allocations 320 on multiple component carriers 305, and the CSI report 325 may be multiplexed in the uplink resource allocation 320 on the penultimate component carrier 305.

Figure 4:
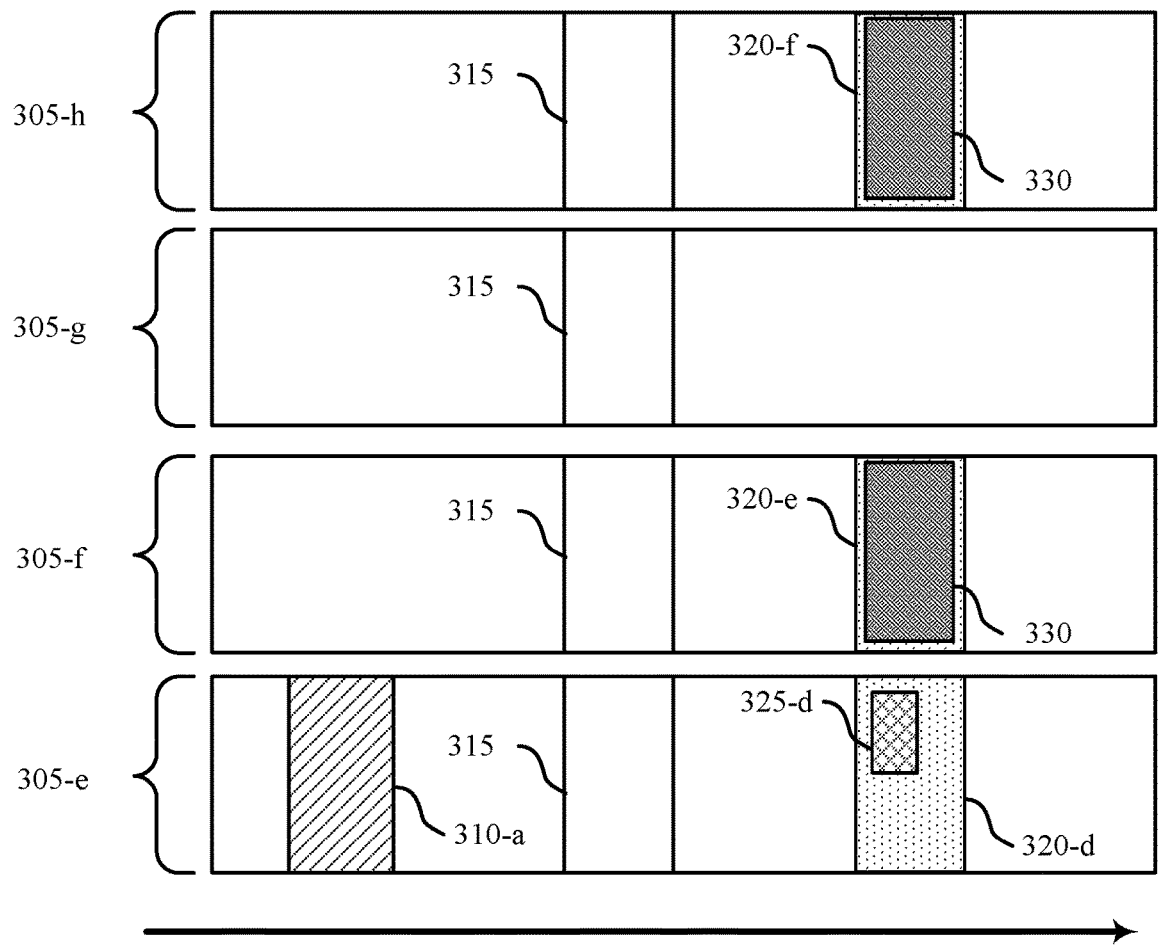
FIG. 4 illustrates an example of a transmission scheme that supports techniques for scheduling across multiple cells in accordance with one or more aspects of the present disclosure.
Figure 4:
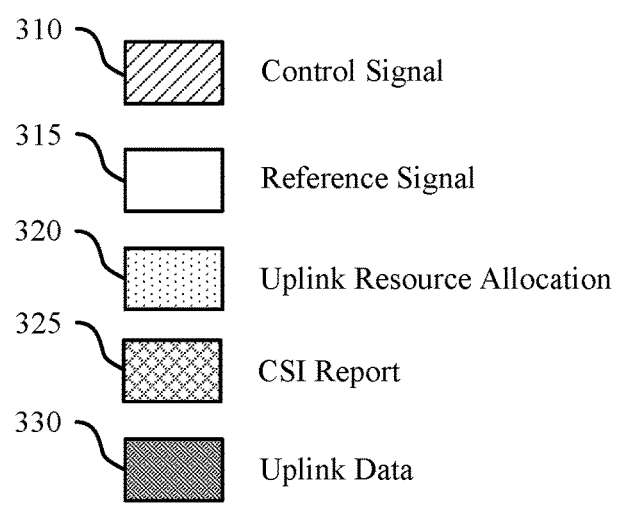

FIG. 4 illustrates an example of a transmission scheme 400 that supports techniques for scheduling across multiple cells in accordance with one or more aspects of the present disclosure. Transmission scheme 400 may implement, or be implemented by, one or more aspects of wireless communications system 100 or wireless communications system 200 and may support uplink and downlink communications between devices. For example, transmission scheme 400 may be implemented by one or more UEs 115 as described with reference to FIGS. 1 and 2.

The transmission scheme 400 depicts control signal 310-*a* that may be transmitted by a network entity to a UE. The control signal 310-*a* may indicate the UE is to monitor for reference signals 315 on a set of component carriers 305 and transmit a CSI report 325 based on measuring the reference signals 315. The UE may determine whether the control signal 310-*a* schedules a single uplink resource allocation 320 or multiple uplink resource allocations 320. In some examples, the control signal 310-*a* may schedule an uplink resource allocation 320-*d* on a component carrier 305-*e*, which may not include uplink data 330. For example, the CSI report 325-*d* may be transmitted in uplink resource allocation 320-*d* without uplink data 330 on the component carrier 305-*d*. The slot of uplink resource allocation 320-*d* without uplink data 330 may be indicated by a slot offset (e.g., an offset between the control signal 310-*a* and the uplink resource allocation 320-*d* on component carrier 305-*e*) associated with the trigger state and indicated by the control signal 310-*a*.

In another example, the control signal 310-*a* may schedule multiple uplink resource allocations 320 (e.g., uplink resource allocation 320-*e* and uplink resource allocation 320-*f*) with uplink data 330 and the uplink resource allocation 320-*d* without uplink data 330. In this example, the CSI report 325-*d* may be transmitted on the uplink resource allocation 320-*d* without uplink data 330 on the component carrier 305-e, and the CSI report 325-d may not be multiplexed with the uplink data 330 in uplink resource allocations 320-e and 320-f. In this example, the slot of the uplink resource allocation 320-d may be based on a slot offset (e.g., an offset between control signal 310-a and the uplink resource allocation 320-d) and the slots of the multiple uplink resource allocations 320-e and 320-f with uplink data 330 may be based on a time domain resource assignment (TDRA). In another example, the slots of the uplink resource allocations 320-d, 320-e, and 320-f may be based on the TDRA. For example, the TDRA of the uplink resource allocation 320-d may be based on an assumption that the uplink resource allocation 320-d may include uplink data 330.

Figure 5:
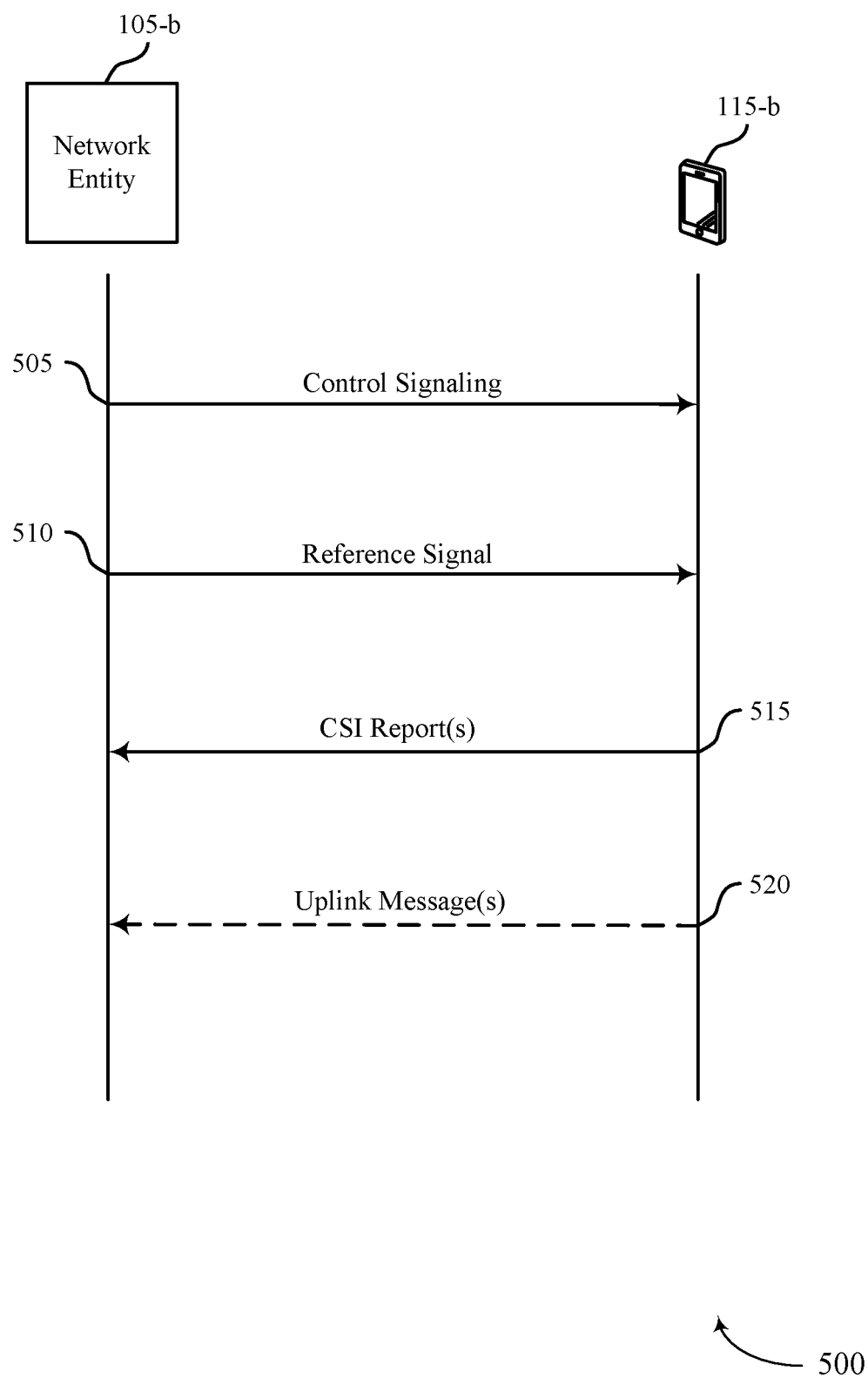
FIG. 5 illustrates an example of a process flow that supports techniques for scheduling across multiple cells in accordance with one or more aspects of the present disclosure.

FIG. 5 illustrates an example of a process flow 500 that supports techniques for scheduling across multiple cells in accordance with one or more aspects of the present disclosure. In some examples, process flow 500 may implement aspects of wireless communications system 100 and wireless communications system 200. For example, process flow 500 may be implemented by a network entity 105-b and a UE 115-b, which may be examples of the corresponding devices described with reference to FIG. 1 and FIG. 2. In the following description of the process flow 500, the operations between the network entity 105-b and the UE 115-b may be transmitted in a different order than the example order shown, or the operations performed by the network entity 105-b and the UE 115-b may be performed in different orders or at different times. Some operations may also be omitted from the process flow 500, and other operations may be added to the process flow 500. The process flow 500 may be implemented by the network entity 105-b and the UE 115-b to support uplink transmission scheduling across multiple cells.

At 505, the network entity 105-b may transmit a control signal (e.g., a DCI message) that schedules transmission of a CSI report (e.g., an A-CSI report) and indicates a set of uplink resource allocations (e.g., PUSCH allocations) on a set of component carriers based on a carrier aggregation configuration.

At 510, the network entity 105-b may transmit a reference signal on a first component carrier included in the set of component carriers. The reference signal may include a reference signal (e.g., a CSI-RS resource). In some examples, the first component carrier may be associated with a first cell of the network entity 105-b and a second component carrier may be associated with a second cell of the network entity 105-b. The UE 115-b may monitor for the reference signal from the network entity 105-b on the first component carrier of the set of component carriers.

At 515, the UE 115-b may transmit the CSI report in an uplink resource allocation on the second component carrier. The set of uplink resource allocations may include the uplink resource allocation and the set of component carriers may include the second component carrier. In some examples, the second component may have a lowest index of the set of the component carriers on which an uplink resource allocation is scheduled by the control signal. In some examples, the UE 115-b may communicate with a first cell of the network entity 105-b via the first component carrier and a second cell of the network entity 105-b via the second component carrier. In some examples, the CSI report may include an A-CSI report. In some examples, the CSI report may include a first portion of the A-CSI report. In some cases, the UE 115-b may transmit the CSI report with uplink data in the uplink resource allocation, such that the CSI report may be multiplexed with the uplink data. In some cases, the UE 115-b may refrain from transmitting uplink data in the uplink resource allocation on the second component carrier.

In some examples, the UE 115-b may transmit a second CSI report in the second uplink resource allocation on a third component carrier. The set of uplink resource allocations may include the second uplink resource allocation and the set of component carriers may include the third component carrier. In some examples, the second CSI report may include a second portion of an A-CSI report. In some examples, the CSI report and the second CSI report may include the same A-CSI report. In some cases, the UE 115-b may encode an A-CSI report, such that the CSI report includes a first portion of the encoded A-CSI report, and the second CSI report includes a second portion of the encoded A-CSI report.

At 520, in some examples, the UE 115-b may transmit an uplink message in a second uplink resource allocation on a third component carrier. In some cases, the uplink message may be sent concurrently with the CSI report. The set of uplink resource allocations may include the second uplink resource allocation and the set of component carriers may include the third component carrier. In some examples, an index of the third component carrier may be less than an index of the second component carrier. In some examples, an index of the third component carrier may have a greatest index of the set of component carriers. In some examples, the UE 115-b may transmit an uplink message in a second uplink resource allocation on the third component carrier. The uplink message may be sent concurrently with the second CSI report. The set of uplink resource allocations may include the second uplink resource allocation and the set of component carriers may include the third component carrier.

Figure 6:
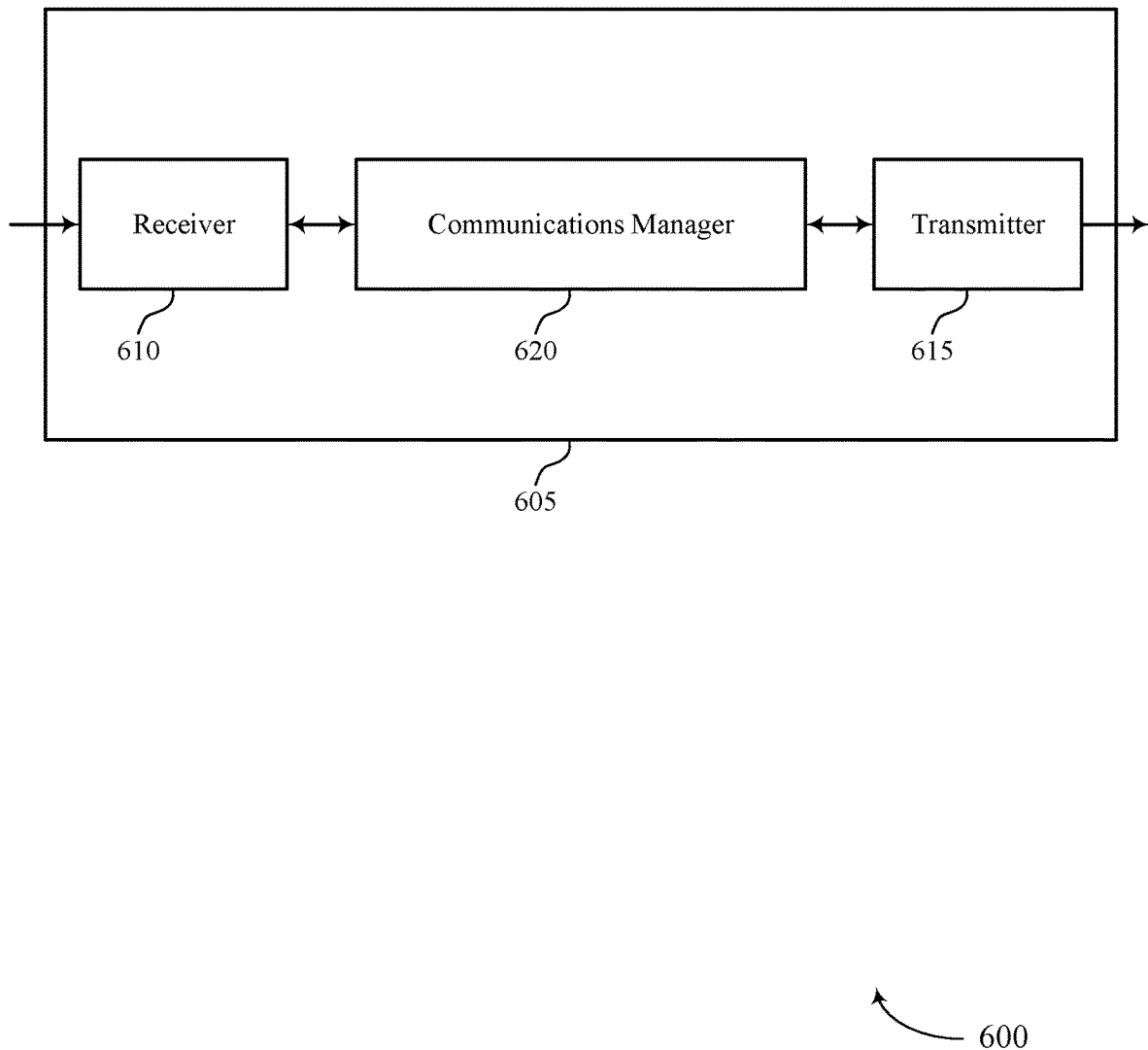
FIGS. 6 and 7 show block diagrams of devices that support techniques for scheduling across multiple cells in accordance with one or more aspects of the present disclosure.

FIG. 6 shows a block diagram 600 of a device 605 that supports techniques for scheduling across multiple cells in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for scheduling across multiple cells). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for scheduling across multiple cells). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for scheduling across multiple cells as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a control signal scheduling transmission of a channel state information report and indicating a set of uplink resource allocations across a set of component carriers according to a carrier aggregation configuration. The communications manager 620 may be configured as or otherwise support a means for monitoring for a reference signal on a first component carrier of the set of component carriers based on receiving the control signal. The communications manager 620 may be configured as or otherwise support a means for transmitting, based on the monitoring, the channel state information report in an uplink resource allocation on a second component carrier, the set of uplink resource allocations including the uplink resource allocation and the set of component carriers including the second component carrier.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption and more efficient utilization of communication resources.

Figure 7:
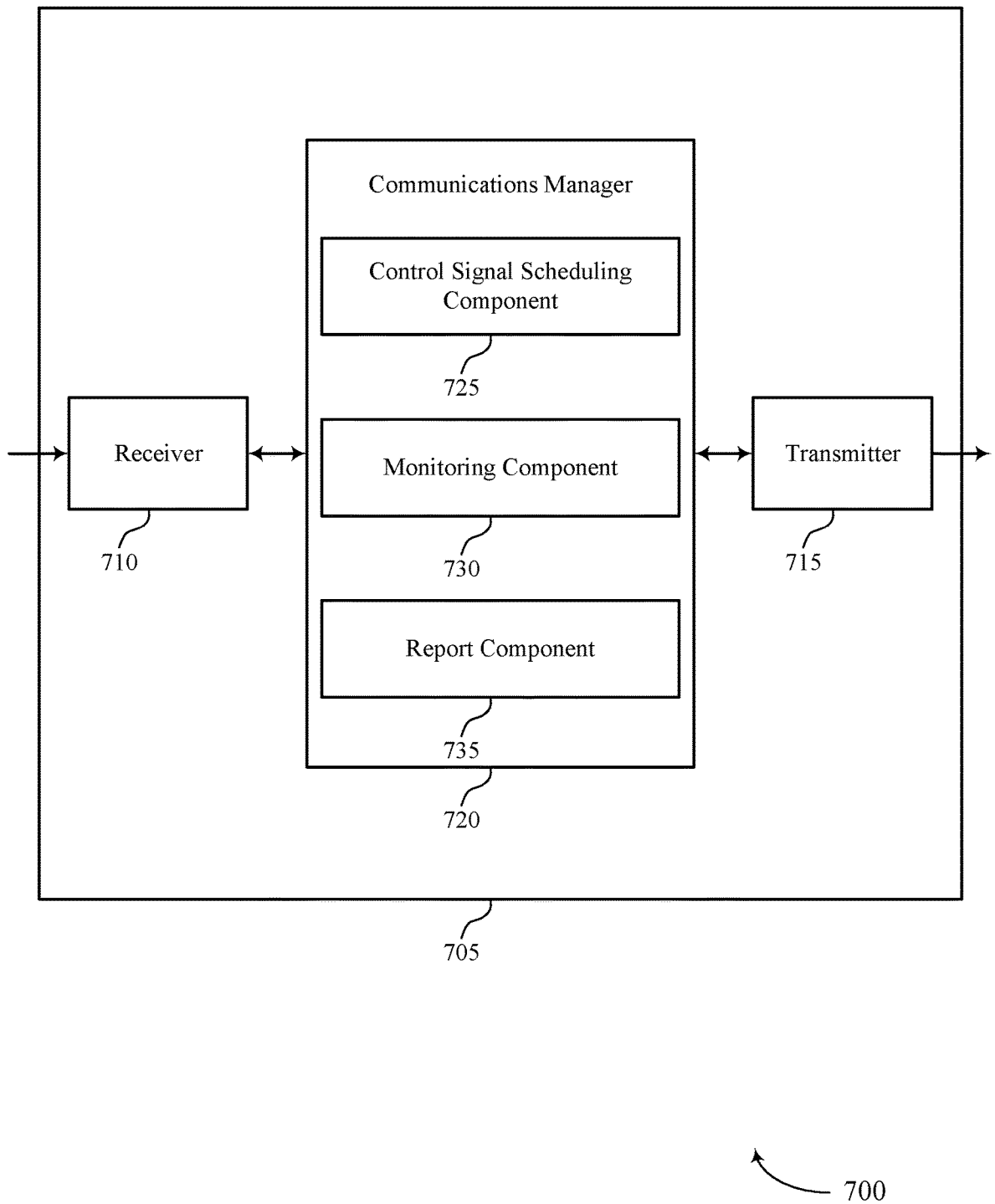

FIG. 7 shows a block diagram 700 of a device 705 that supports techniques for scheduling across multiple cells in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for scheduling across multiple cells). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for scheduling across multiple cells). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for scheduling across multiple cells as described herein. For example, the communications manager 720 may include a control signal scheduling component 725, a monitoring component 730, a report component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The control signal scheduling component 725 may be configured as or otherwise support a means for receiving a control signal scheduling transmission of a channel state information report and indicating a set of uplink resource allocations across a set of component carriers according to a carrier aggregation configuration. The monitoring component 730 may be configured as or otherwise support a means for monitoring for a reference signal on a first component carrier of the set of component carriers based on receiving the control signal. The report component 735 may be configured as or otherwise support a means for transmitting, based on the monitoring, the channel state information report in an uplink resource allocation on a second component carrier, the set of uplink resource allocations including the uplink resource allocation and the set of component carriers including the second component carrier.

Figure 8:
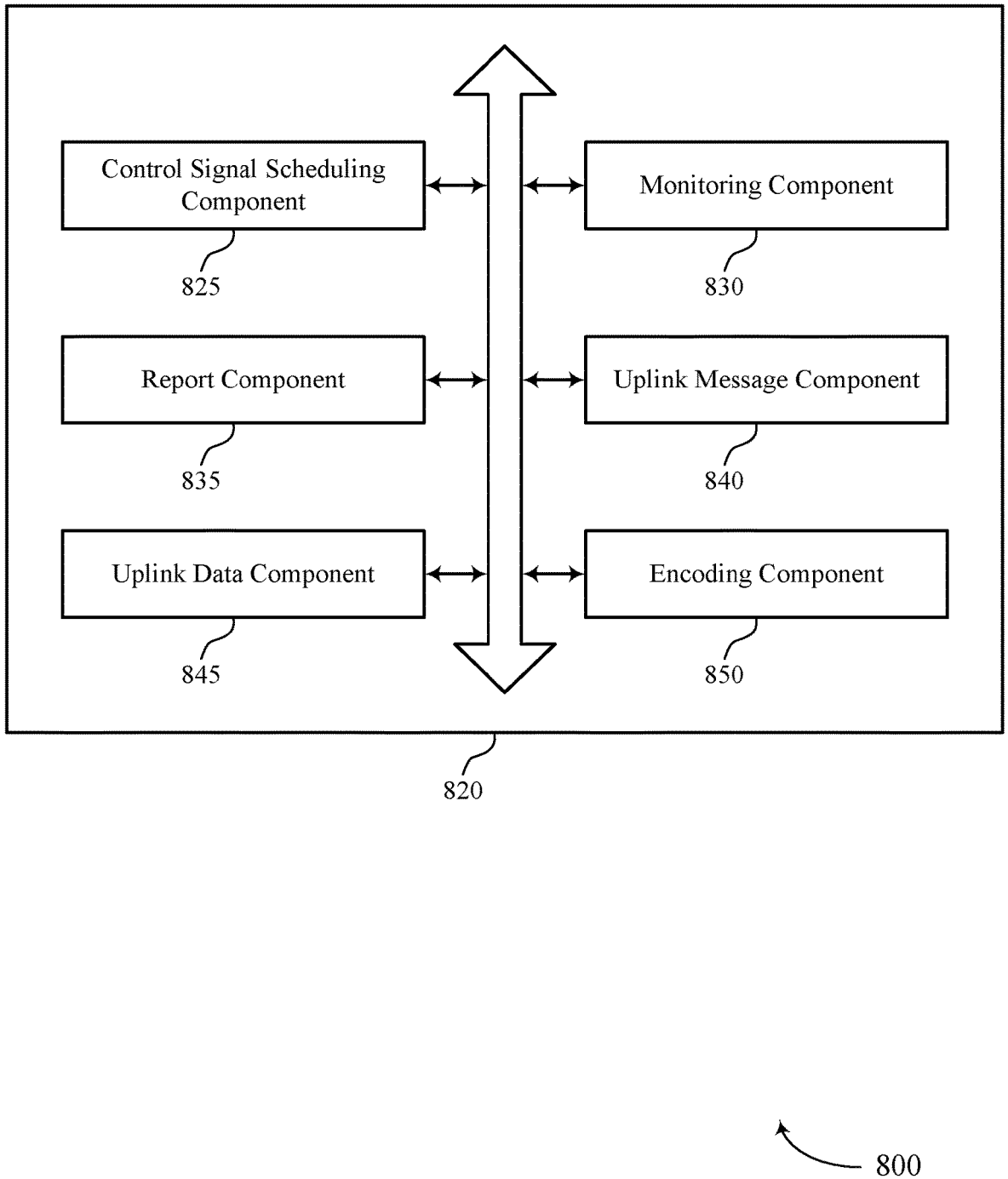
FIG. 8 shows a block diagram of a communications manager that supports techniques for scheduling across multiple cells in accordance with one or more aspects of the present disclosure.

FIG. 8 shows a block diagram 800 of a communications manager 820 that supports techniques for scheduling across multiple cells in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for scheduling across multiple cells as described herein. For example, the communications manager 820 may include a control signal scheduling component 825, a monitoring component 830, a report component 835, an uplink message component 840, an uplink data component 845, an encoding component 850, or any combination thereof. Each of these components may communicate, directly or indirectly, with one another (e.g., via one or more buses).

The communications manager 820 may support wireless communication at a UE in accordance with examples as disclosed herein. The control signal scheduling component 825 may be configured as or otherwise support a means for receiving a control signal scheduling transmission of a channel state information report and indicating a set of uplink resource allocations across a set of component carriers according to a carrier aggregation configuration. The monitoring component 830 may be configured as or otherwise support a means for monitoring for a reference signal on a first component carrier of the set of component carriers based on receiving the control signal. The report component 835 may be configured as or otherwise support a means for transmitting, based on the monitoring, the channel state information report in an uplink resource allocation on a second component carrier, the set of uplink resource allocations including the uplink resource allocation and the set of component carriers including the second component carrier.

In some examples, the uplink message component 840 may be configured as or otherwise support a means for transmitting an uplink message in a second uplink resource allocation on a third component carrier, the set of uplink resource allocations including the second uplink resource allocation and the set of component carriers including the third component carrier.

In some examples, an index of the third component carrier is less than an index of the second component carrier.

In some examples, an index of the third component carrier has a greatest index of the set of component carriers.

In some examples, to support transmitting the channel state information report, the report component 835 may be configured as or otherwise support a means for transmitting the channel state information report with uplink data in the uplink resource allocation, where the channel state information report is multiplexed with the uplink data.

In some examples, the report component 835 may be configured as or otherwise support a means for transmitting, based on the monitoring, a second channel state information report in a second uplink resource allocation on a third component carrier, the set of uplink resource allocations including the second uplink resource allocation and the set of component carriers including the third component carrier.

In some examples, the channel state information report and second channel state information report include a same channel state information report.

In some examples, the encoding component 850 may be configured as or otherwise support a means for encoding an aperiodic channel state information report based on the monitoring, where the channel state information report includes a first portion of the encoded aperiodic channel state information report and the second channel state information report includes a second portion of the encoded aperiodic channel state information report.

In some examples, the encoding component 850 may be configured as or otherwise support a means for encoding a first portion of an aperiodic channel state information report based on the monitoring, where the channel state information report includes the encoded first portion. In some examples, the encoding component 850 may be configured as or otherwise support a means for encoding a second portion of the aperiodic channel state information report based on the monitoring, where the second channel state information report includes the encoded second portion.

In some examples, the uplink data component 845 may be configured as or otherwise support a means for refraining from transmitting, based on receiving the control signal, uplink data in the uplink resource allocation on the second component carrier.

In some examples, the report component 835 may be configured as or otherwise support a means for communicating with a first cell via the first component carrier. In some examples, the report component 835 may be configured as or otherwise support a means for communicating with a second cell via the second component carrier.

In some examples, the second component carrier has a lowest index of the set of component carriers.

In some examples, the channel state information report includes an aperiodic channel state information report.

In some examples, the reference signal includes a channel state information reference signal.

Figure 9:
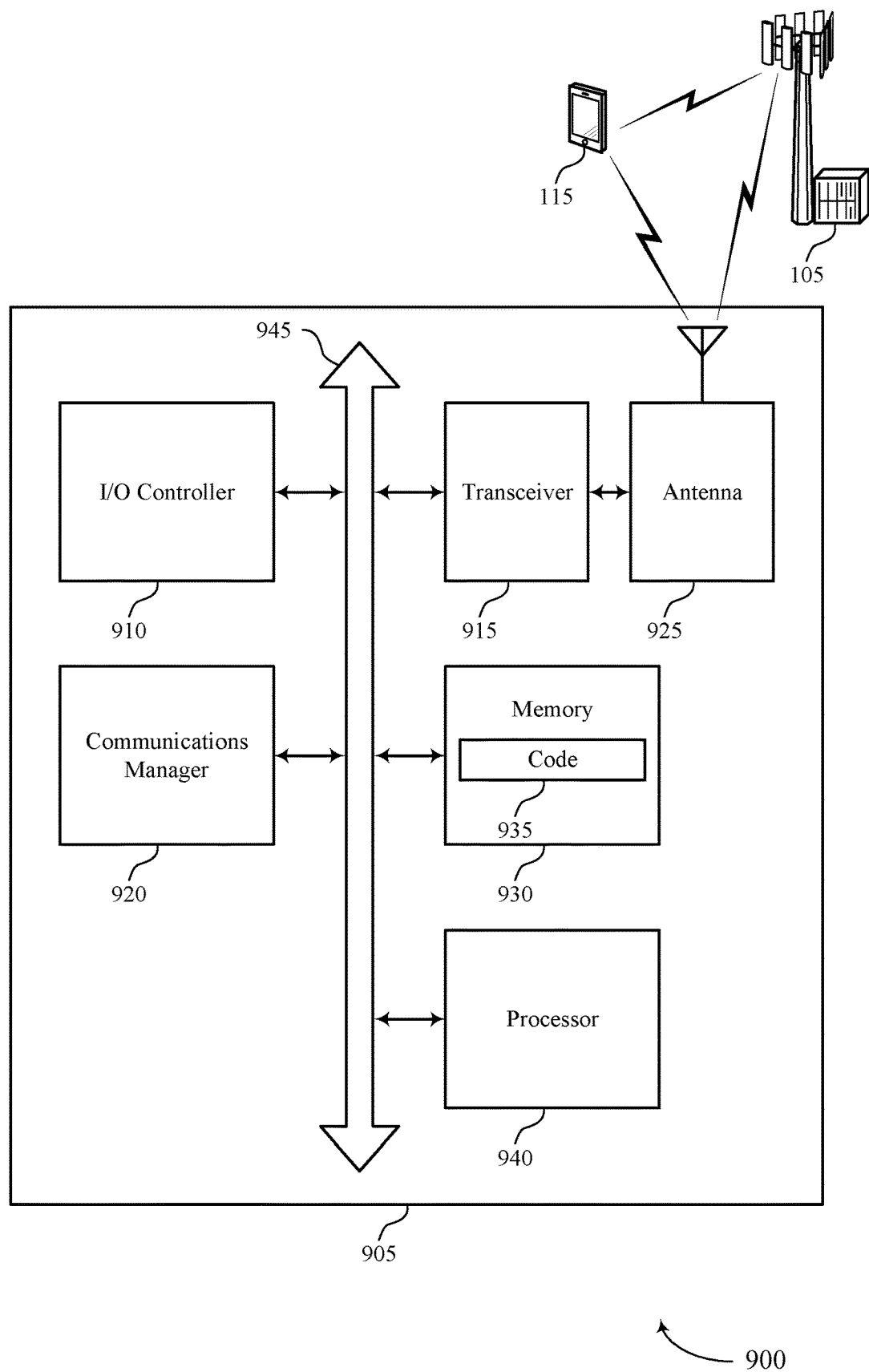
FIG. 9 shows a diagram of a system including a device that supports techniques for scheduling across multiple cells in accordance with one or more aspects of the present disclosure.

FIG. 9 shows a diagram of a system 900 including a device 905 that supports techniques for scheduling across multiple cells in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for scheduling across multiple cells). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a control signal scheduling transmission of a channel state information report and indicating a set of uplink resource allocations across a set of component carriers according to a carrier aggregation configuration. The communications manager 920 may be configured as or otherwise support a means for monitoring for a reference signal on a first component carrier of the set of component carriers based on receiving the control signal. The communications manager 920 may be configured as or otherwise support a means for transmitting, based on the monitoring, the channel state information report in an uplink resource allocation on a second component carrier, the set of uplink resource allocations including the uplink resource allocation and the set of component carriers including the second component carrier.

By including or configuring the communications manager 920 in accordance with examples as described herein, the device 905 may support techniques for more efficient utilization of communication resources and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for scheduling across multiple cells as described herein, or the processor 940 and the memory 930 may be otherwise configured to perform or support such operations.

Figure 10:
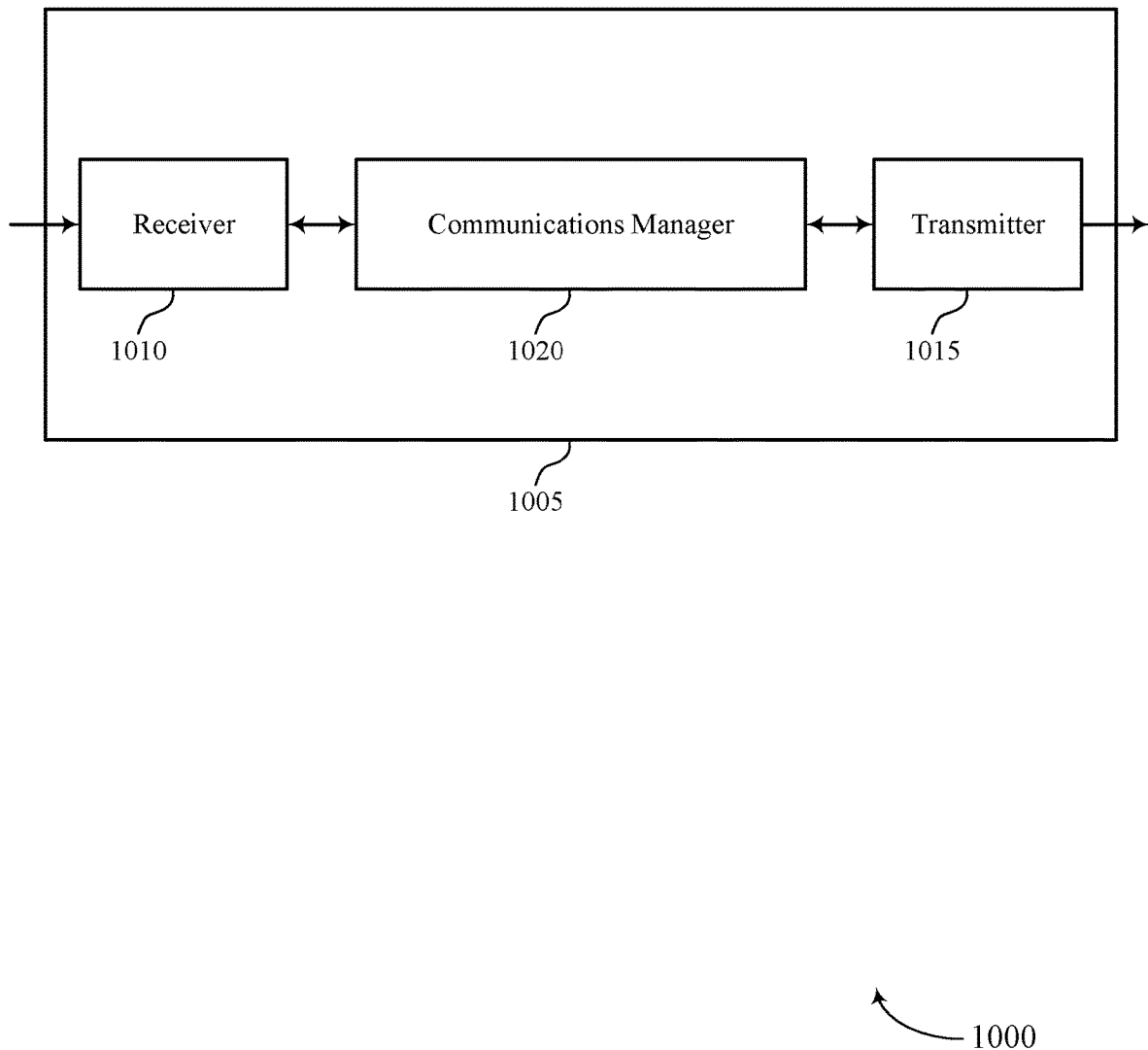
FIGS. 10 and 11 show block diagrams of devices that support techniques for scheduling across multiple cells in accordance with one or more aspects of the present disclosure.

FIG. 10 shows a block diagram 1000 of a device 1005 that supports techniques for scheduling across multiple cells in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for scheduling across multiple cells as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting a control signal scheduling transmission of a channel state information report and indicating a set of uplink resource allocations across a set of component carriers according to a carrier aggregation configuration. The communications manager 1020 may be configured as or otherwise support a means for transmitting a reference signal on a first component carrier of the set of component carriers based on receiving the control signal. The communications manager 1020 may be configured as or otherwise support a means for receiving, based on transmitting the reference signal, the channel state information report in an uplink resource allocation on a second component carrier, the set of uplink resource allocations including the uplink resource allocation and the set of component carriers including the second component carrier.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption and more efficient utilization of communication resources.

Figure 11:
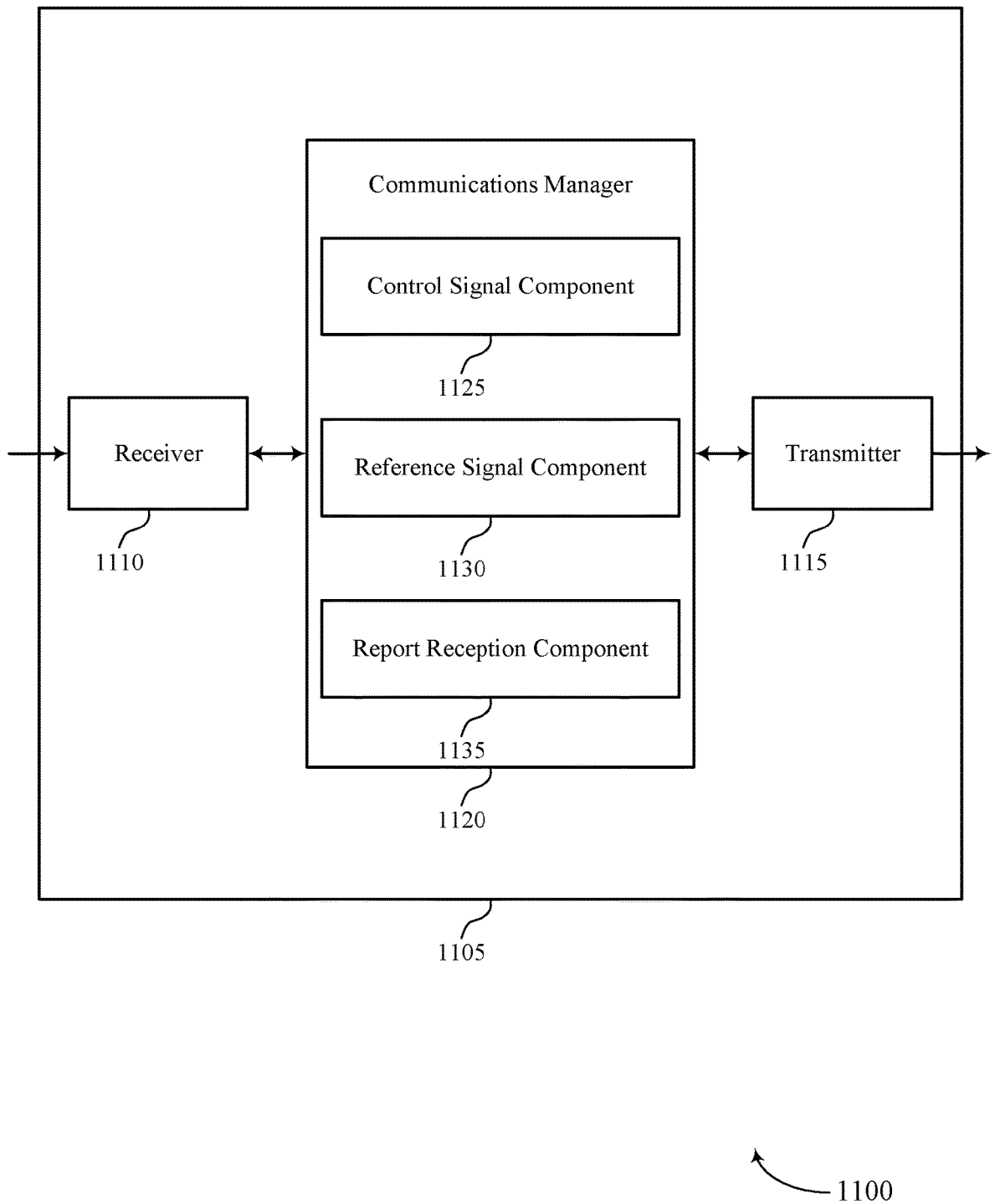

FIG. 11 shows a block diagram 1100 of a device 1105 that supports techniques for scheduling across multiple cells in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for scheduling across multiple cells as described herein. For example, the communications manager 1120 may include a control signal component 1125, a reference signal component 1130, a report reception component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The control signal component 1125 may be configured as or otherwise support a means for transmitting a control signal scheduling transmission of a channel state information report and indicating a set of uplink resource allocations across a set of component carriers according to a carrier aggregation configuration. The reference signal component 1130 may be configured as or otherwise support a means for transmitting a reference signal on a first component carrier of the set of component carriers based on receiving the control signal. The report reception component 1135 may be configured as or otherwise support a means for receiving, based on transmitting the reference signal, the channel state information report in an uplink resource allocation on a second component carrier, the set of uplink resource allocations including the uplink resource allocation and the set of component carriers including the second component carrier.

Figure 12:
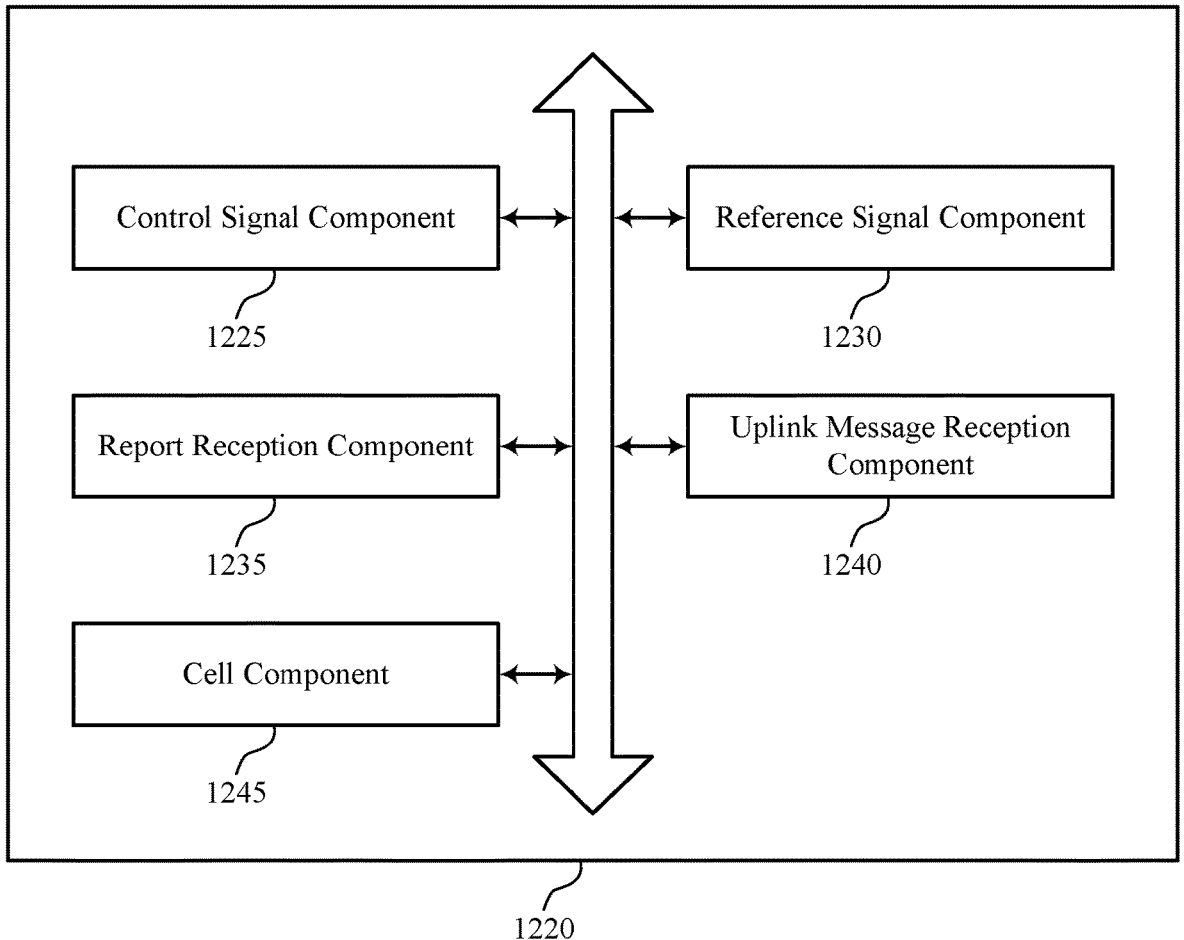
FIG. 12 shows a block diagram of a communications manager that supports techniques for scheduling across multiple cells in accordance with one or more aspects of the present disclosure.

FIG. 12 shows a block diagram 1200 of a communications manager 1220 that supports techniques for scheduling across multiple cells in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for scheduling across multiple cells as described herein. For example, the communications manager 1220 may include a control signal component 1225, a reference signal component 1230, a report reception component 1235, an uplink message reception component 1240, a cell component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The control signal component 1225 may be configured as or otherwise support a means for transmitting a control signal scheduling transmission of a channel state information report and indicating a set of uplink resource allocations across a set of component carriers according to a carrier aggregation configuration. The reference signal component 1230 may be configured as or otherwise support a means for transmitting a reference signal on a first component carrier of the set of component carriers based on receiving the control signal. The report reception component 1235 may be configured as or otherwise support a means for receiving, based on transmitting the reference signal, the channel state information report in an uplink resource allocation on a second component carrier, the set of uplink resource allocations including the uplink resource allocation and the set of component carriers including the second component carrier.

In some examples, the uplink message reception component 1240 may be configured as or otherwise support a means for receiving an uplink message in a second uplink resource allocation on a third component carrier, the set of uplink resource allocations including the second uplink resource allocation and the set of component carriers including the third component carrier.

In some examples, an index of the third component carrier is less than an index of the second component carrier.

In some examples, an index of the third component carrier has a greatest index of the set of component carriers.

In some examples, to support receiving the channel state information report, the report reception component 1235 may be configured as or otherwise support a means for receiving the channel state information report with uplink data in the uplink resource allocation, where the channel state information report is multiplexed with the uplink data.

In some examples, the report reception component 1235 may be configured as or otherwise support a means for receiving, based on transmitting the reference signal, a second channel state information report in a second uplink resource allocation on a third component carrier, the set of uplink resource allocations including the second uplink resource allocation and the set of component carriers including the third component carrier.

In some examples, the channel state information report and the second channel state information report include a same channel state information report.

In some examples, the channel state information report includes a first portion of an encoded aperiodic channel state information report. In some examples, the second channel state information report includes a second portion of the encoded aperiodic channel state information report.

In some examples, the channel state information report includes an encoded first portion of an aperiodic channel state information report. In some examples, the second channel state information report includes an encoded second portion of the aperiodic channel state information report.

In some examples, the first component carrier is associated with a first cell of the network entity. In some examples, the second component carrier is associated with a second cell of the network entity.

In some examples, the second component carrier has a lowest index of the set of component carriers.

In some examples, the channel state information report includes an aperiodic channel state information report.

In some examples, the reference signal includes a channel state information reference signal.

Figure 13:
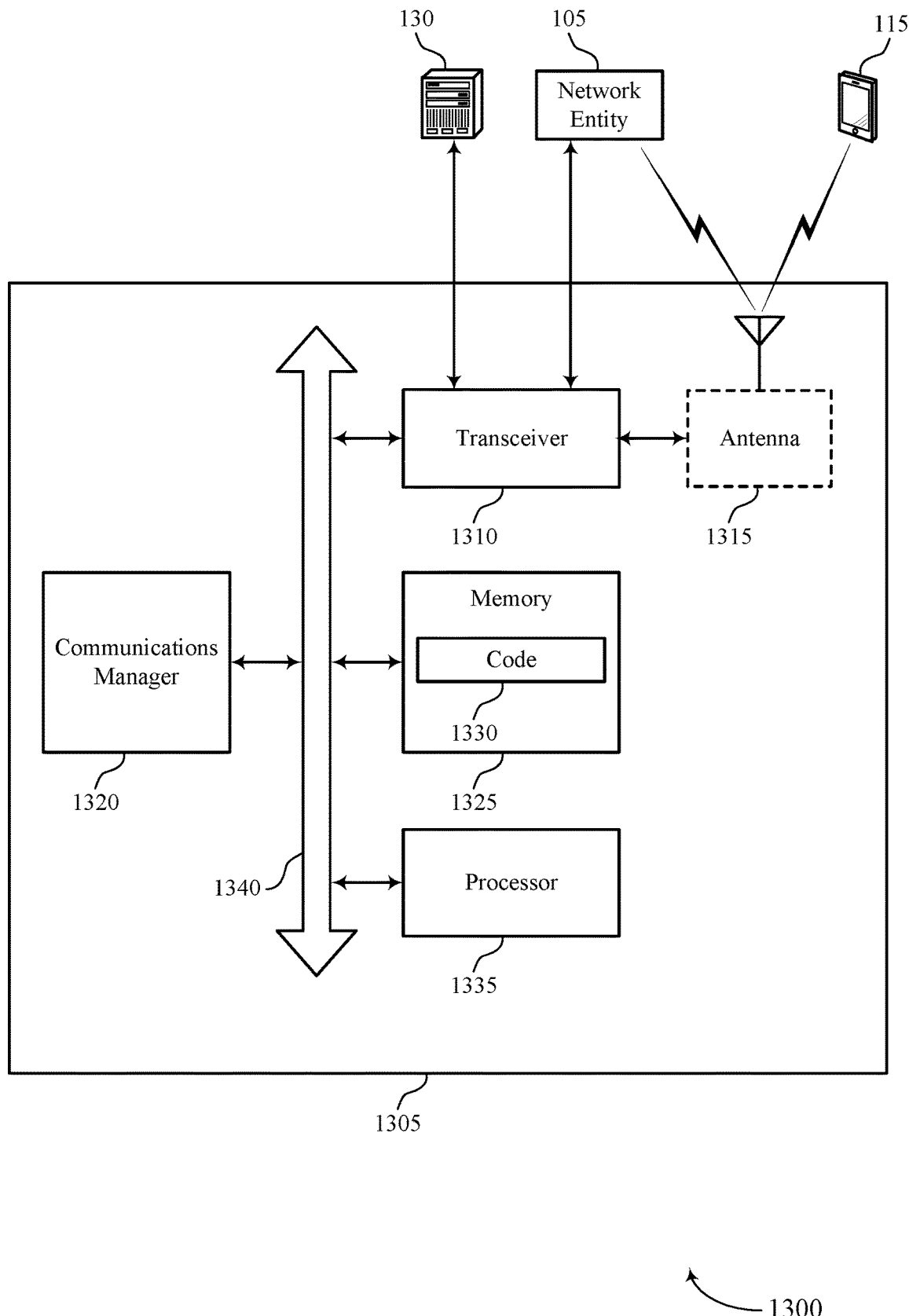
FIG. 13 shows a diagram of a system including a device that supports techniques for scheduling across multiple cells in accordance with one or more aspects of the present disclosure.

FIG. 13 shows a diagram of a system 1300 including a device 1305 that supports techniques for scheduling across multiple cells in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for scheduling across multiple cells). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting a control signal scheduling transmission of a channel state information report and indicating a set of uplink resource allocations across a set of component carriers according to a carrier aggregation configuration. The communications manager 1320 may be configured as or otherwise support a means for transmitting a reference signal on a first component carrier of the set of component carriers based on receiving the control signal. The communications manager 1320 may be configured as or otherwise support a means for receiving, based on transmitting the reference signal, the channel state information report in an uplink resource allocation on a second component carrier, the set of uplink resource allocations including the uplink resource allocation and the set of component carriers including the second component carrier.

By including or configuring the communications manager 1320 in accordance with examples as described herein, the device 1305 may support techniques for more efficient utilization of communication resources, improved coordination between devices and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of techniques for scheduling across multiple cells as described herein, or the processor 1335 and the memory 1325 may be otherwise configured to perform or support such operations.

Figure 14:
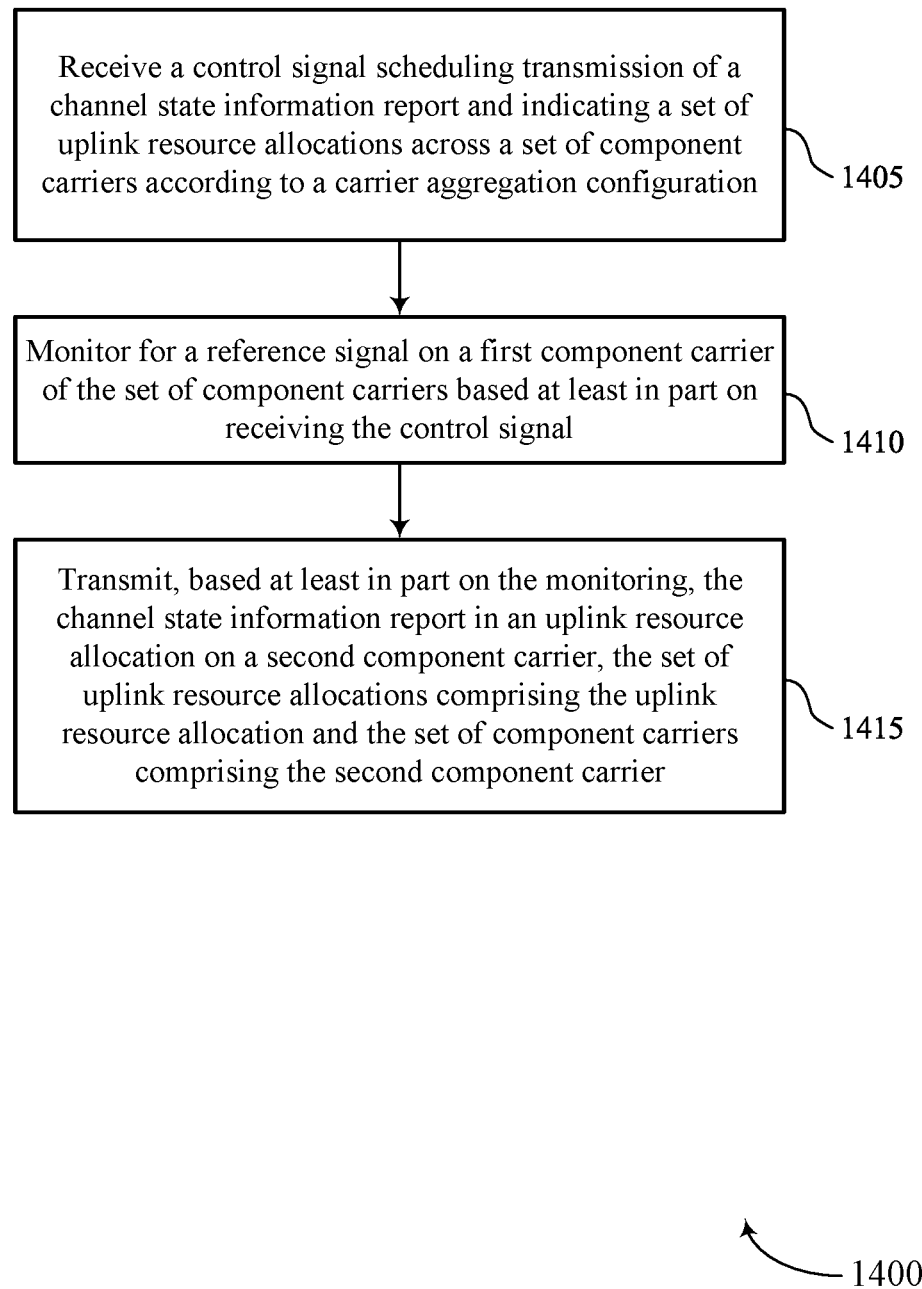
FIGS. 14 through 17 show flowcharts illustrating methods that support techniques for scheduling across multiple cells in accordance with one or more aspects of the present disclosure.

FIG. 14 shows a flowchart illustrating a method 1400 that supports techniques for scheduling across multiple cells in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a control signal scheduling transmission of a channel state information report and indicating a set of uplink resource allocations across a set of component carriers according to a carrier aggregation configuration. The operations of 1405 may be performed in accordance with examples as disclosed herein. In some examples, aspects of the operations of 1405 may be performed by a control signal scheduling component 825 as described with reference to FIG. 8.

At 1410, the method may include monitoring for a reference signal on a first component carrier of the set of component carriers based on receiving the control signal. The operations of 1410 may be performed in accordance with examples as disclosed herein. In some examples, aspects of the operations of 1410 may be performed by a monitoring component 830 as described with reference to FIG. 8.

At 1415, the method may include transmitting, based on the monitoring, the channel state information report in an uplink resource allocation on a second component carrier, the set of uplink resource allocations including the uplink resource allocation and the set of component carriers including the second component carrier. The operations of 1415 may be performed in accordance with examples as disclosed herein. In some examples, aspects of the operations of 1415 may be performed by a report component 835 as described with reference to FIG. 8.

Figure 15:
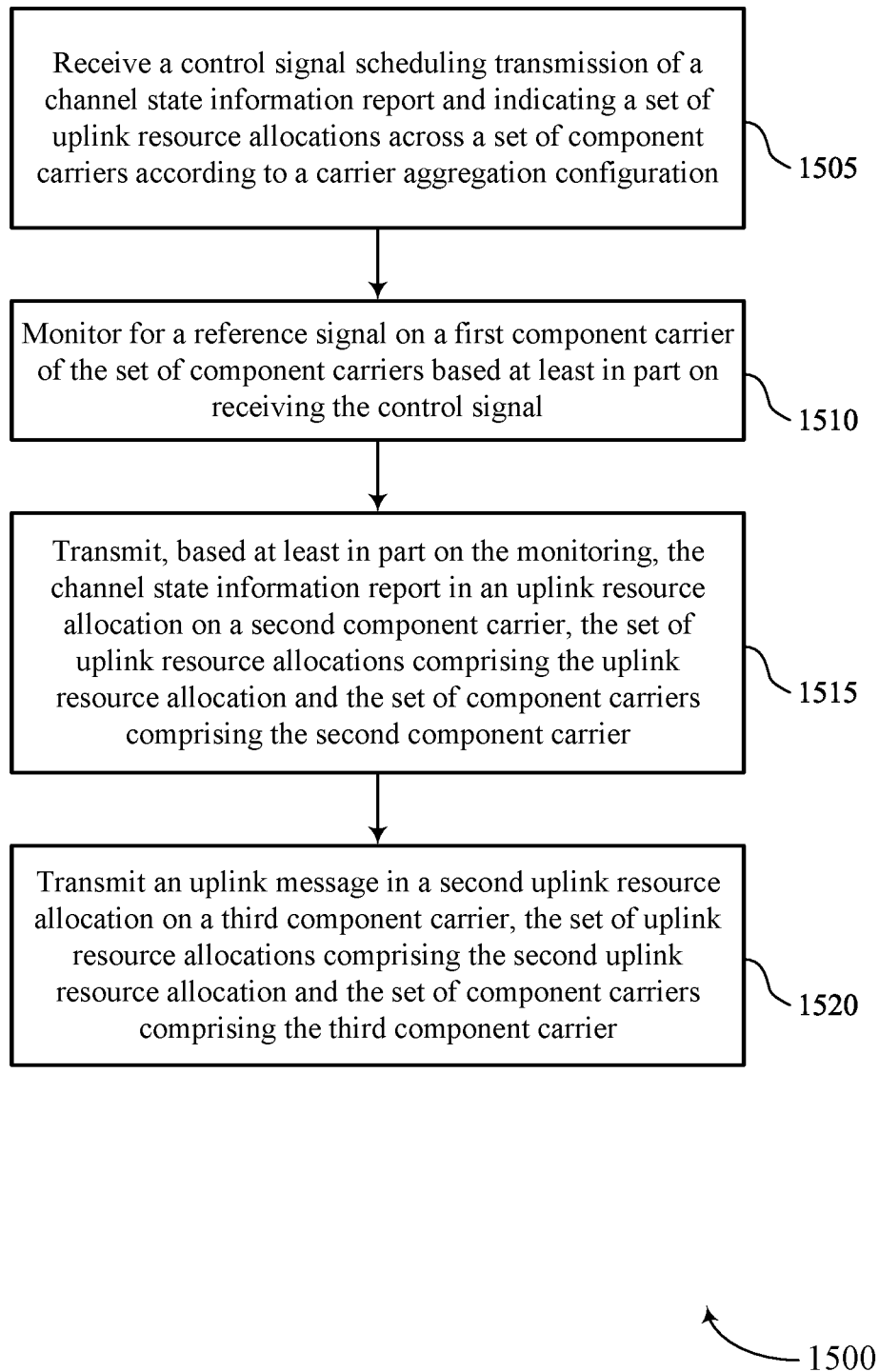

FIG. 15 shows a flowchart illustrating a method 1500 that supports techniques for scheduling across multiple cells in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a control signal scheduling transmission of a channel state information report and indicating a set of uplink resource allocations across a set of component carriers according to a carrier aggregation configuration. The operations of 1505 may be performed in accordance with examples as disclosed herein. In some examples, aspects of the operations of 1505 may be performed by a control signal scheduling component 825 as described with reference to FIG. 8.

At 1510, the method may include monitoring for a reference signal on a first component carrier of the set of component carriers based on receiving the control signal. The operations of 1510 may be performed in accordance with examples as disclosed herein. In some examples, aspects of the operations of 1510 may be performed by a monitoring component 830 as described with reference to FIG. 8.

At 1515, the method may include transmitting, based on the monitoring, the channel state information report in an uplink resource allocation on a second component carrier, the set of uplink resource allocations including the uplink resource allocation and the set of component carriers including the second component carrier. The operations of 1515 may be performed in accordance with examples as disclosed herein. In some examples, aspects of the operations of 1515 may be performed by a report component 835 as described with reference to FIG. 8.

At 1520, the method may include transmitting an uplink message in a second uplink resource allocation on a third component carrier, the set of uplink resource allocations including the second uplink resource allocation and the set of component carriers including the third component carrier. The operations of 1520 may be performed in accordance with examples as disclosed herein. In some examples, aspects of the operations of 1520 may be performed by an uplink message component 840 as described with reference to FIG. 8.

Figure 16:
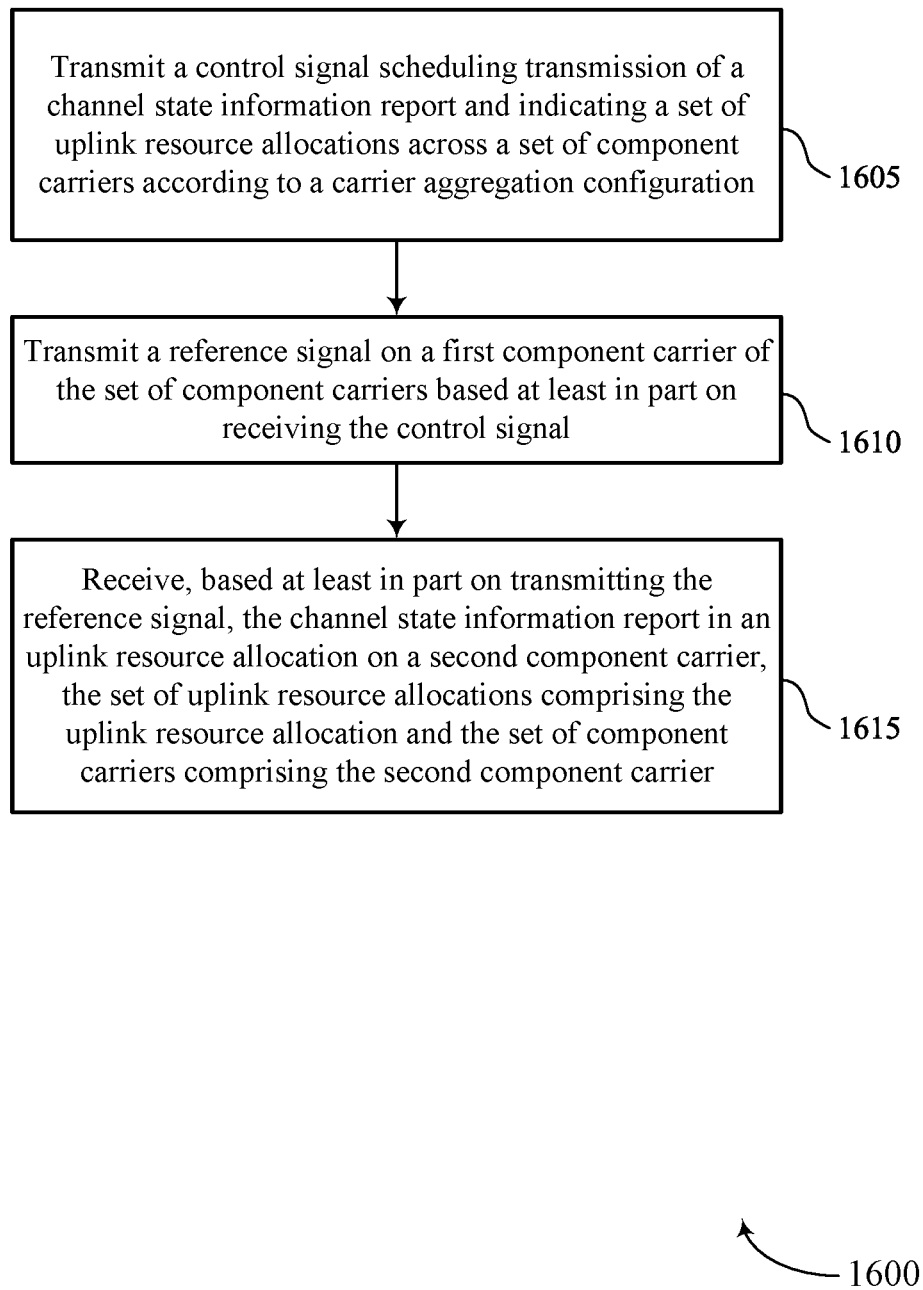

FIG. 16 shows a flowchart illustrating a method 1600 that supports techniques for scheduling across multiple cells in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a control signal scheduling transmission of a channel state information report and indicating a set of uplink resource allocations across a set of component carriers according to a carrier aggregation configuration. The operations of 1605 may be performed in accordance with examples as disclosed herein. In some examples, aspects of the operations of 1605 may be performed by a control signal component 1225 as described with reference to FIG. 12.

At 1610, the method may include transmitting a reference signal on a first component carrier of the set of component carriers based on receiving the control signal. The operations of 1610 may be performed in accordance with examples as disclosed herein. In some examples, aspects of the operations of 1610 may be performed by a reference signal component 1230 as described with reference to FIG. 12.

At 1615, the method may include receiving, based on transmitting the reference signal, the channel state information report in an uplink resource allocation on a second component carrier, the set of uplink resource allocations including the uplink resource allocation and the set of component carriers including the second component carrier. The operations of 1615 may be performed in accordance with examples as disclosed herein. In some examples, aspects of the operations of 1615 may be performed by a report reception component 1235 as described with reference to FIG. 12.

Figure 17:
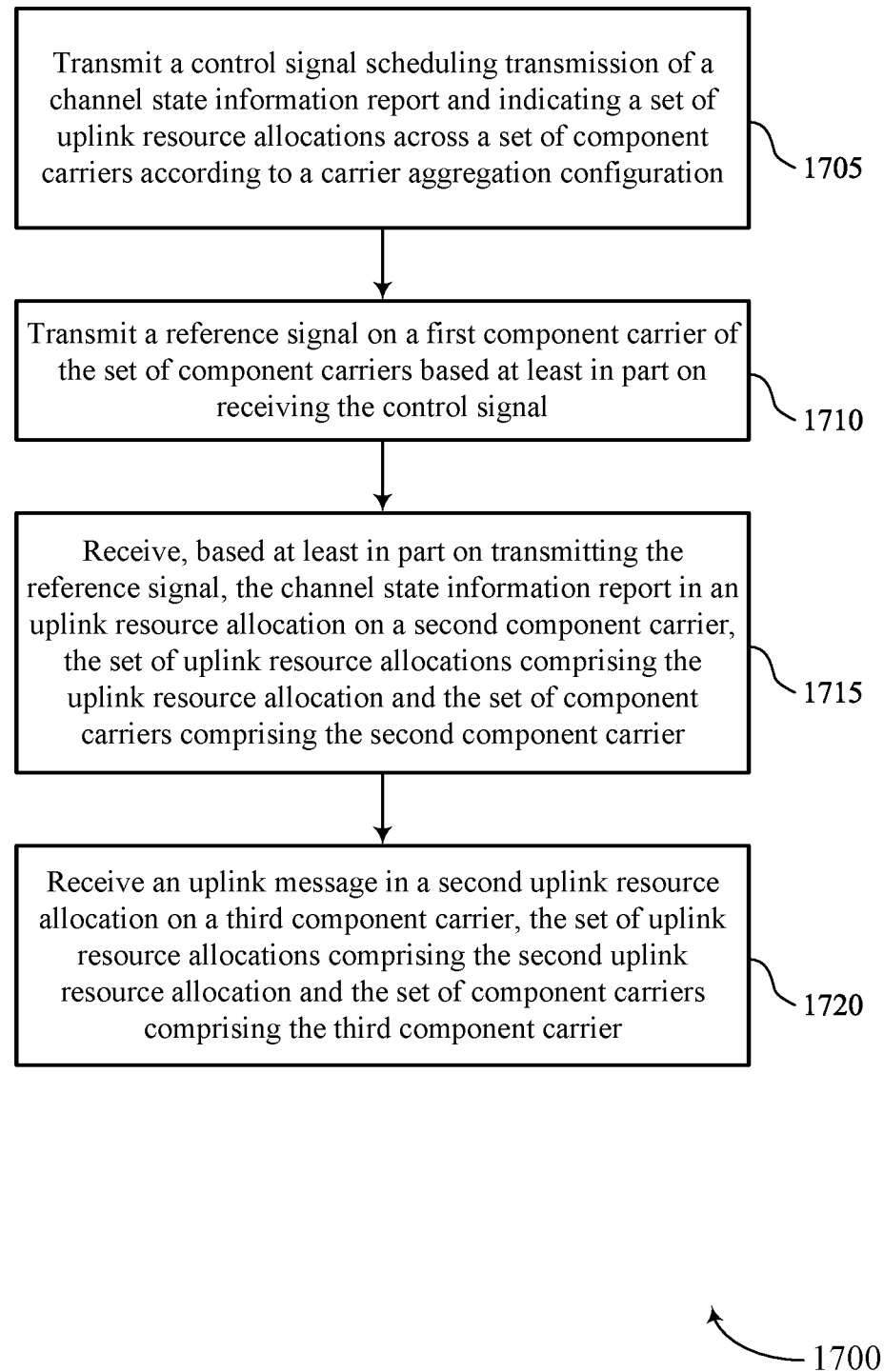

FIG. 17 shows a flowchart illustrating a method 1700 that supports techniques for scheduling across multiple cells in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a control signal scheduling transmission of a channel state information report and indicating a set of uplink resource allocations across a set of component carriers according to a carrier aggregation configuration. The operations of 1705 may be performed in accordance with examples as disclosed herein. In some examples, aspects of the operations of 1705 may be performed by a control signal component 1225 as described with reference to FIG. 12.

At 1710, the method may include transmitting a reference signal on a first component carrier of the set of component carriers based on receiving the control signal. The operations of 1710 may be performed in accordance with examples as disclosed herein. In some examples, aspects of the operations of 1710 may be performed by a reference signal component 1230 as described with reference to FIG. 12.

At 1715, the method may include receiving, based on transmitting the reference signal, the channel state information report in an uplink resource allocation on a second component carrier, the set of uplink resource allocations including the uplink resource allocation and the set of component carriers including the second component carrier. The operations of 1715 may be performed in accordance with examples as disclosed herein. In some examples, aspects of the operations of 1715 may be performed by a report reception component 1235 as described with reference to FIG. 12.

At 1720, the method may include receiving an uplink message in a second uplink resource allocation on a third component carrier, the set of uplink resource allocations including the second uplink resource allocation and the set of component carriers including the third component carrier. The operations of 1720 may be performed in accordance with examples as disclosed herein. In some examples, aspects of the operations of 1720 may be performed by an uplink message reception component 1240 as described with reference to FIG. 12.

The following provides an overview of aspects of the present disclosure:

Aspect 1: A method for wireless communication at a UE, comprising: receiving a control signal scheduling transmission of a channel state information report and indicating a set of uplink resource allocations across a set of component carriers according to a carrier aggregation configuration; monitoring for a reference signal on a first component carrier of the set of component carriers based at least in part on receiving the control signal; and transmitting, based at least in part on the monitoring, the channel state information report in an uplink resource allocation on a second component carrier, the set of uplink resource allocations comprising the uplink resource allocation and the set of component carriers comprising the second component carrier.

Aspect 2: The method of aspect 1, further comprising: transmitting an uplink message in a second uplink resource allocation on a third component carrier, the set of uplink resource allocations comprising the second uplink resource allocation and the set of component carriers comprising the third component carrier.

Aspect 3: The method of aspect 2, wherein an index of the third component carrier is less than an index of the second component carrier.

Aspect 4: The method of any of aspects 2 through 3, wherein an index of the third component carrier has a greatest index of the set of component carriers.

Aspect 5: The method of any of aspects 1 through 4, wherein transmitting the channel state information report further comprises: transmitting the channel state information report with uplink data in the uplink resource allocation, wherein the channel state information report is multiplexed with the uplink data.

Aspect 6: The method of any of aspects 1 through 5, further comprising: transmitting, based at least in part on the monitoring, a second channel state information report in a second uplink resource allocation on a third component carrier, the set of uplink resource allocations comprising the second uplink resource allocation and the set of component carriers comprising the third component carrier.

Aspect 7: The method of aspect 6, wherein the channel state information report and second channel state information report comprise a same channel state information report.

Aspect 8: The method of any of aspects 6 through 7, further comprising: encoding an aperiodic channel state information report based at least in part on the monitoring, wherein the channel state information report comprises a first portion of the encoded aperiodic channel state information report and the second channel state information report comprises a second portion of the encoded aperiodic channel state information report.

Aspect 9: The method of any of aspects 6 through 8, further comprising: encoding a first portion of an aperiodic channel state information report based at least in part on the monitoring, wherein the channel state information report comprises the encoded first portion; and encoding a second portion of the aperiodic channel state information report based at least in part on the monitoring, wherein the second channel state information report comprises the encoded second portion.

Aspect 10: The method of any of aspects 1 through 9, further comprising: refraining from transmitting, based at least in part on receiving the control signal, uplink data in the uplink resource allocation on the second component carrier.

Aspect 11: The method of any of aspects 1 through 10, further comprising: communicating with a first cell via the first component carrier; and communicating with a second cell via the second component carrier.

Aspect 12: The method of any of aspects 1 through 11, wherein the second component carrier has a lowest index of the set of component carriers.

Aspect 13: The method of any of aspects 1 through 12, wherein the channel state information report comprises an aperiodic channel state information report.

Aspect 14: The method of any of aspects 1 through 13, wherein the reference signal comprises a channel state information reference signal.

Aspect 15: A method for wireless communication at a network entity, comprising: transmitting a control signal scheduling transmission of a channel state information report and indicating a set of uplink resource allocations across a set of component carriers according to a carrier aggregation configuration; transmitting a reference signal on a first component carrier of the set of component carriers based at least in part on receiving the control signal; and receiving, based at least in part on transmitting the reference signal, the channel state information report in an uplink resource allocation on a second component carrier, the set of uplink resource allocations comprising the uplink resource allocation and the set of component carriers comprising the second component carrier.

Aspect 16: The method of aspect 15, further comprising: receiving an uplink message in a second uplink resource allocation on a third component carrier, the set of uplink resource allocations comprising the second uplink resource allocation and the set of component carriers comprising the third component carrier.

Aspect 17: The method of aspect 16, wherein an index of the third component carrier is less than an index of the second component carrier.

Aspect 18: The method of any of aspects 16 through 17, wherein an index of the third component carriers has a greatest index of the set of component carriers.

Aspect 19: The method of any of aspects 15 through 18, wherein receiving the channel state information report further comprises: receiving the channel state information report with uplink data in the uplink resource allocation, wherein the channel state information report is multiplexed with the uplink data.

Aspect 20: The method of any of aspects 15 through 19, further comprising: receiving, based at least in part on transmitting the reference signal, a second channel state information report in a second uplink resource allocation on a third component carrier, the set of uplink resource allocations comprising the second uplink resource allocation and the set of component carriers comprising the third component carrier.

Aspect 21: The method of aspect 20, wherein the channel state information report and the second channel state information report comprise a same channel state information report.

Aspect 22: The method of any of aspects 20 through 21, wherein the channel state information report comprises a first portion of an encoded aperiodic channel state information report; and the second channel state information report comprises a second portion of the encoded aperiodic channel state information report.

Aspect 23: The method of any of aspects 20 through 22, wherein the channel state information report comprises an encoded first portion of an aperiodic channel state information report; and the second channel state information report comprises an encoded second portion of the aperiodic channel state information report.

Aspect 24: The method of any of aspects 15 through 23, wherein the first component carrier is associated with a first cell of the network entity; and the second component carrier is associated with a second cell of the network entity.

Aspect 25: The method of any of aspects 15 through 24, wherein the second component carrier has a lowest index of the set of component carriers.

Aspect 26: The method of any of aspects 15 through 25, wherein the channel state information report comprises an aperiodic channel state information report.

Aspect 27: The method of any of aspects 15 through 26, wherein the reference signal comprises a channel state information reference signal.

Aspect 28: An apparatus for wireless communication at a UE, comprising a processor; memory coupled with the processor; and instructions stored in the memory and executable by the processor to cause the apparatus to perform a method of any of aspects 1 through 14.

Aspect 29: An apparatus for wireless communication at a UE, comprising at least one means for performing a method of any of aspects 1 through 14.

Aspect 30: A non-transitory computer-readable medium storing code for wireless communication at a UE, the code comprising instructions executable by a processor to perform a method of any of aspects 1 through 14.

Aspect 31: An apparatus for wireless communication at a network entity, comprising a processor; memory coupled with the processor; and instructions stored in the memory and executable by the processor to cause the apparatus to perform a method of any of aspects 15 through 27.

Aspect 32: An apparatus for wireless communication at a network entity, comprising at least one means for performing a method of any of aspects 15 through 27.

Aspect 33: A non-transitory computer-readable medium storing code for wireless communication at a network entity, the code comprising instructions executable by a processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a first control signal that schedules transmission of a first channel state information report and indicating a set of uplink resource allocations for the first channel state information report across a set of component carriers according to a carrier aggregation configuration, wherein the set of uplink resource allocations for the first channel state information report comprises a first uplink resource allocation for a first component carrier of the set of component carriers and a second uplink resource allocation for a second component carrier of the set of component carriers;
   monitoring for a reference signal on the first component carrier of the set of component carriers based at least in part on receiving the first control signal; and
   transmitting, based at least in part on the monitoring, the first channel state information report in the second uplink resource allocation on the second component carrier.

2. The method of claim 1, further comprising:
   transmitting an uplink message in a third uplink resource allocation on a third component carrier, the set of uplink resource allocations comprising the third uplink resource allocation and the set of component carriers comprising the third component carrier.

3. The method of claim 2, wherein an index of the third component carrier is less than an index of the second component carrier.

4. The method of claim 2, wherein an index of the third component carrier has a greatest index of the set of component carriers.

5. The method of claim 1, wherein transmitting the first channel state information report further comprises:
   transmitting the first channel state information report with uplink data in the second uplink resource allocation, wherein the first channel state information report is multiplexed with the uplink data.

6. The method of claim 1, further comprising:
   transmitting, based at least in part on the monitoring, a second channel state information report in a third uplink resource allocation on a third component carrier, the set of uplink resource allocations comprising the third uplink resource allocation and the set of component carriers comprising the third component carrier.

7. The method of claim 6, wherein the first channel state information report and the second channel state information report comprise a same channel state information report.

8. The method of claim 6, further comprising:
   encoding an aperiodic channel state information report based at least in part on the monitoring, wherein the first channel state information report comprises a first portion of the encoded aperiodic channel state information report and the second channel state information report comprises a second portion of the encoded aperiodic channel state information report.

9. The method of claim 6, further comprising:
encoding a first portion of an aperiodic channel state information report based at least in part on the monitoring, wherein the first channel state information report comprises the encoded first portion; and
encoding a second portion of the aperiodic channel state information report based at least in part on the monitoring, wherein the second channel state information report comprises the encoded second portion.

10. The method of claim 1, further comprising:
refraining from transmitting, based at least in part on receiving the first control signal, uplink data in the second uplink resource allocation on the second component carrier.

11. The method of claim 1, further comprising:
communicating with a first cell via the first component carrier; and
communicating with a second cell via the second component carrier.

12. The method of claim 1, wherein the second component carrier has a lowest index of the set of component carriers.

13. The method of claim 1, wherein the first channel state information report comprises an aperiodic channel state information report.

14. The method of claim 1, wherein the reference signal comprises a channel state information reference signal.

15. A method for wireless communication at a network entity, comprising:
transmitting a first control signal that schedules transmission of a first channel state information report and indicating a set of uplink resource allocations for the first channel state information report across a set of component carriers according to a carrier aggregation configuration, wherein the set of uplink resource allocations for the first channel state information report comprises a first uplink resource allocation for a first component carrier of the set of component carriers and a second uplink resource allocation for a second component carrier of the set of component carriers;
transmitting a reference signal on the first component carrier of the set of component carriers based at least in part on receiving the first control signal; and
receiving, based at least in part on transmitting the reference signal, the first channel state information report in the second uplink resource allocation on the second component carrier.

16. The method of claim 15, further comprising:
receiving an uplink message in a third uplink resource allocation on a third component carrier, the set of uplink resource allocations comprising the third uplink resource allocation and the set of component carriers comprising the third component carrier.

17. The method of claim 16, wherein an index of the third component carrier is less than an index of the second component carrier.

18. The method of claim 16, wherein an index of the third component carrier has a greatest index of the set of component carriers.

19. The method of claim 15, wherein receiving the first channel state information report further comprises:
receiving the first channel state information report with uplink data in the second uplink resource allocation, wherein the first channel state information report is multiplexed with the uplink data.

20. The method of claim 15, further comprising:
receiving, based at least in part on transmitting the reference signal, a second channel state information report in a third uplink resource allocation on a third component carrier, the set of uplink resource allocations comprising the third uplink resource allocation and the set of component carriers comprising the third component carrier.

21. The method of claim 20, wherein the first channel state information report and the second channel state information report comprise a same channel state information report.

22. The method of claim 20, wherein:
the first channel state information report comprises a first portion of an encoded aperiodic channel state information report; and
the second channel state information report comprises a second portion of the encoded aperiodic channel state information report.

23. The method of claim 20, wherein:
the first channel state information report comprises an encoded first portion of an aperiodic channel state information report; and
the second channel state information report comprises an encoded second portion of the aperiodic channel state information report.

24. The method of claim 15, wherein:
the first component carrier is associated with a first cell of the network entity; and
the second component carrier is associated with a second cell of the network entity.

25. The method of claim 15, wherein the second component carrier has a lowest index of the set of component carriers.

26. The method of claim 15, wherein the first channel state information report comprises an aperiodic channel state information report.

27. The method of claim 15, wherein the reference signal comprises a channel state information reference signal.

28. An apparatus for wireless communication at a user equipment (UE), comprising:
a processor;
memory coupled with the processor; and
instructions stored in the memory and executable by the processor to cause the apparatus to:
receive a first control signal that schedules transmission of a first channel state information report and indicating a set of uplink resource allocations for the first channel state information report across a set of component carriers according to a carrier aggregation configuration, wherein the set of uplink resource allocations for the first channel state information report comprises a first uplink resource allocation for a first component carrier of the set of component carriers and a second uplink resource allocation for a second component carrier of the set of component carriers;
monitor for a reference signal on the first component carrier of the set of component carriers based at least in part on receiving the first control signal; and
transmit, based at least in part on the monitoring, the first channel state information report in the second uplink resource allocation on the second component carrier.

29. The apparatus of claim 28, wherein the instructions are further executable by the processor to cause the apparatus to:

transmit an uplink message in a third uplink resource allocation on a third component carrier, the set of uplink resource allocations comprising the third uplink resource allocation and the set of component carriers comprising the third component carrier.

30. An apparatus for wireless communication at a network entity, comprising:

a processor;

memory coupled with the processor; and instructions stored in the memory and executable by the processor to cause the apparatus to:

transmit a first control signal that schedules transmission of a first channel state information report and indicating a set of uplink resource allocations for the first channel state information report across a set of component carriers according to a carrier aggregation configuration, wherein the set of uplink resource allocations for the first channel state information report comprises a first uplink resource allocation for a first component carrier of the set of component carriers and a second uplink resource allocation for a second component carrier of the set of component carriers;

transmit a reference signal on the first component carrier of the set of component carriers based at least in part on receiving the first control signal; and receive, based at least in part on transmitting the reference signal, the first channel state information report in the second uplink resource allocation on the second component carrier.

* * * * *